Figure 1:
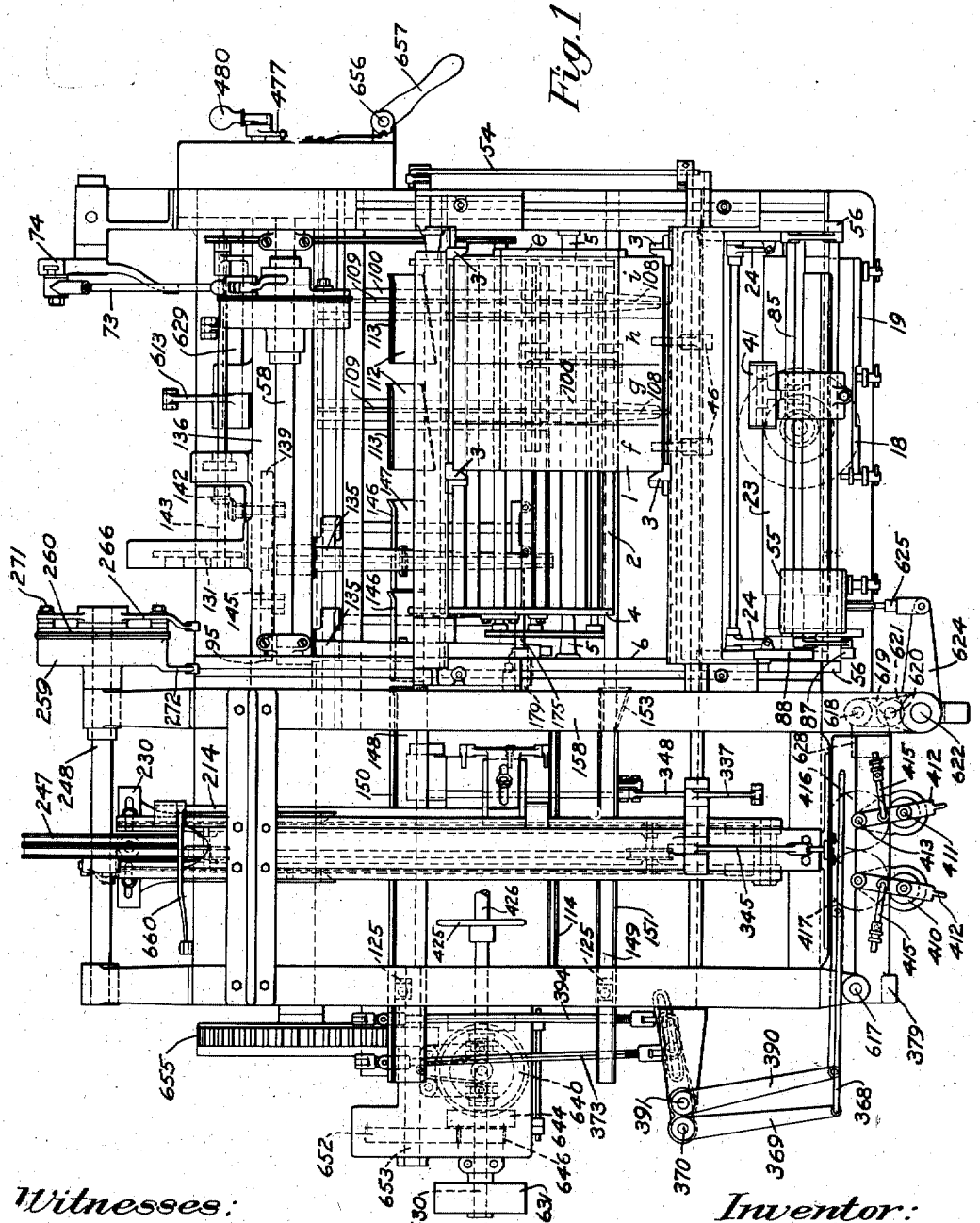

G. A. ROBINSON.
MACHINE FOR FORMING CARTONS.
APPLICATION FILED JULY 7, 1914.

1,205,566.

Patented Nov. 21, 1916.
20 SHEETS—SHEET 1.

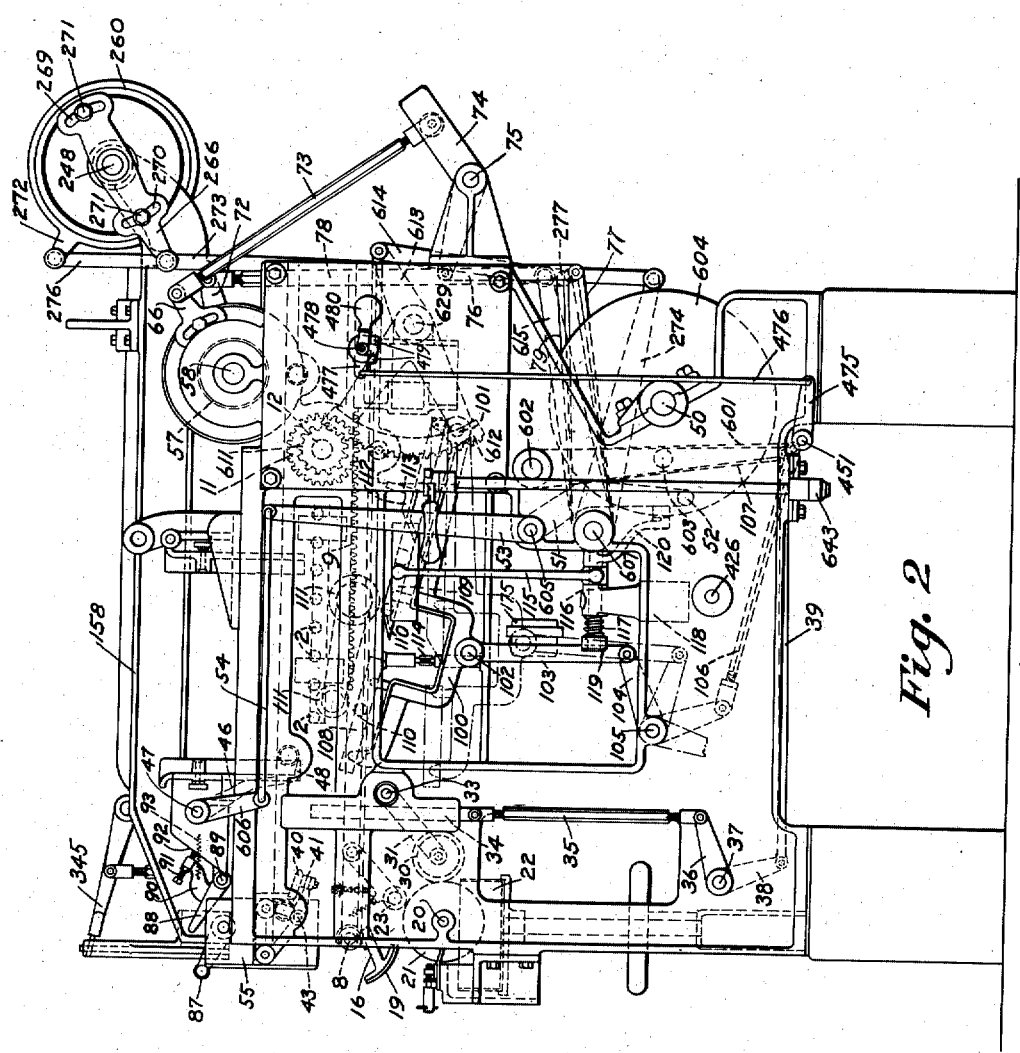

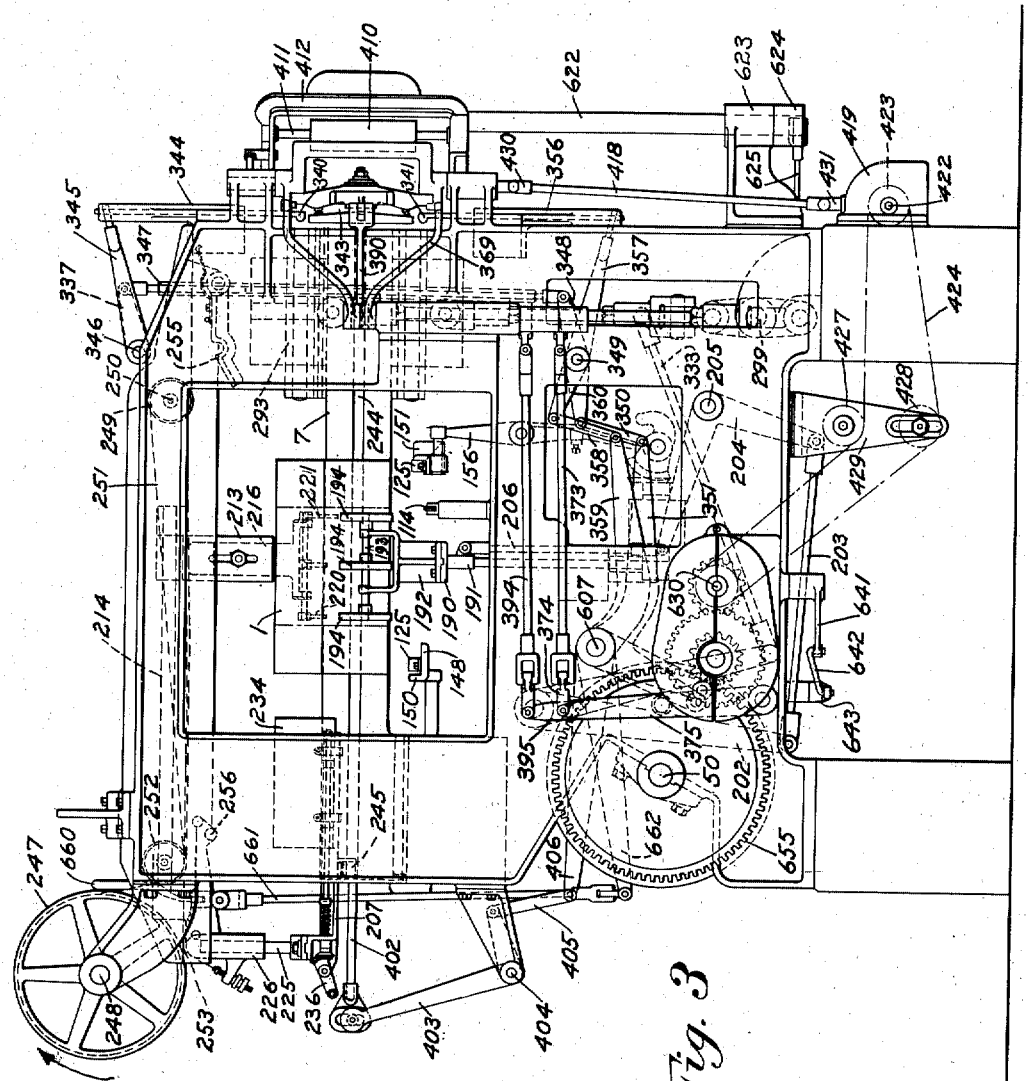

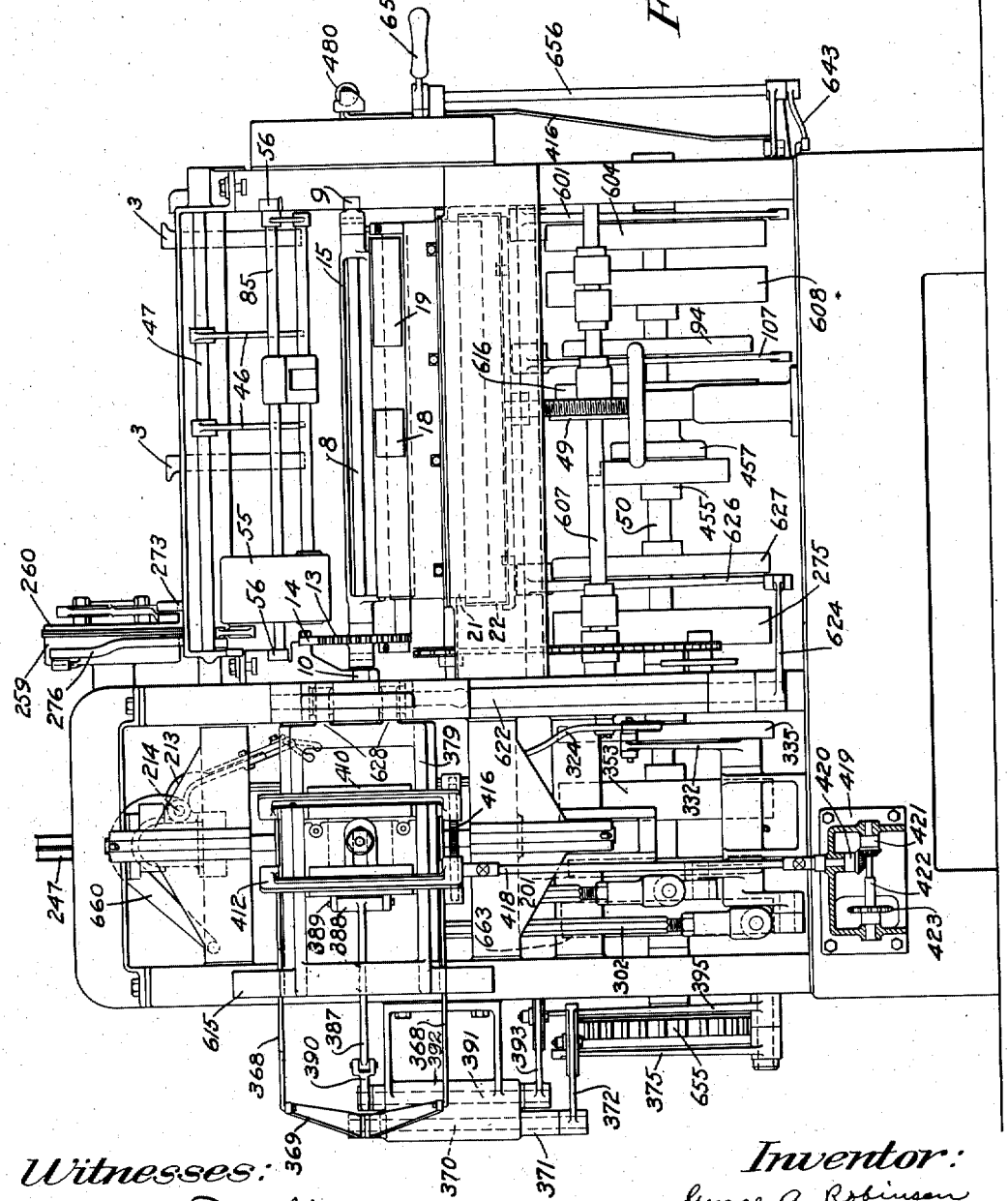

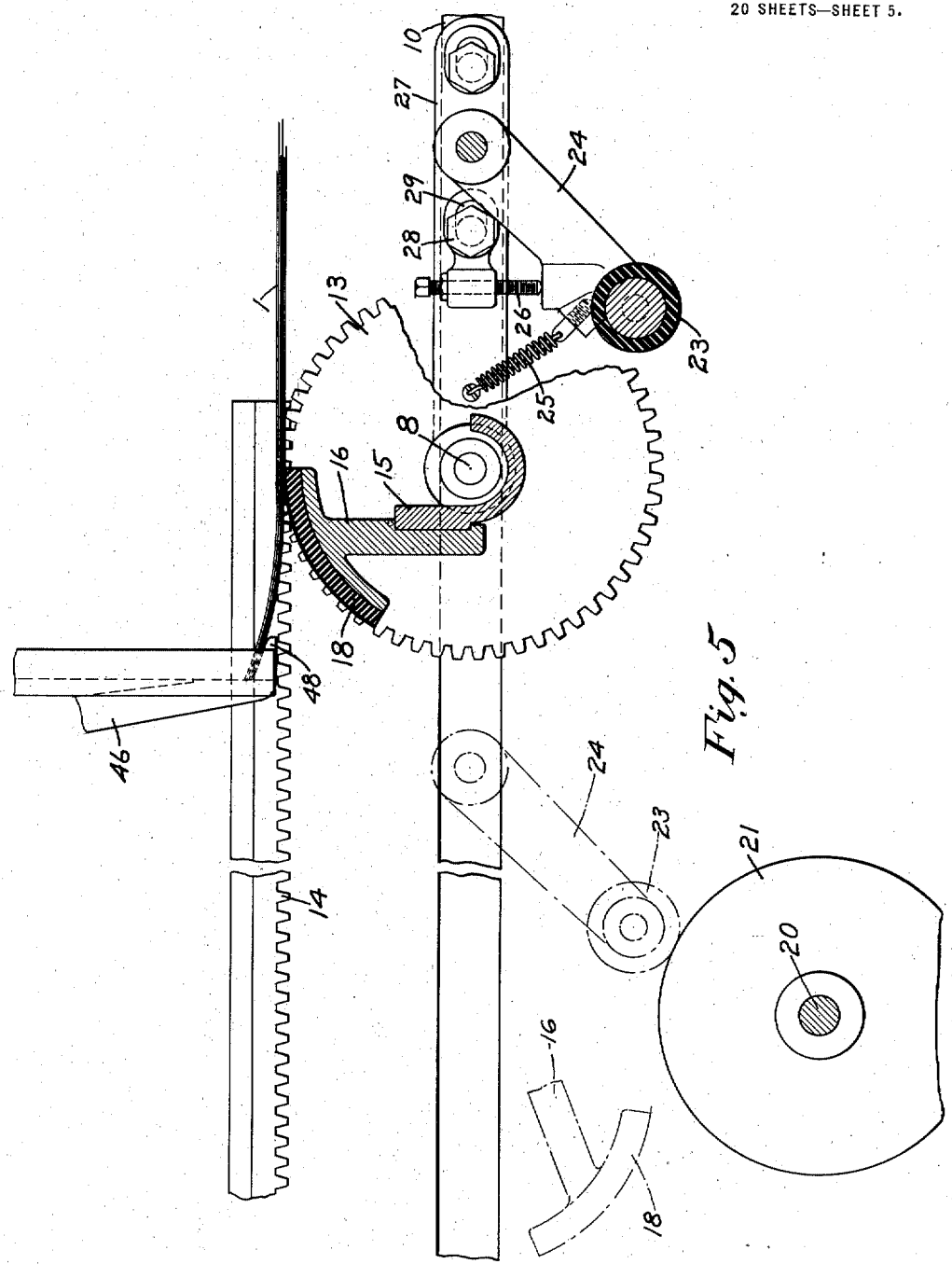

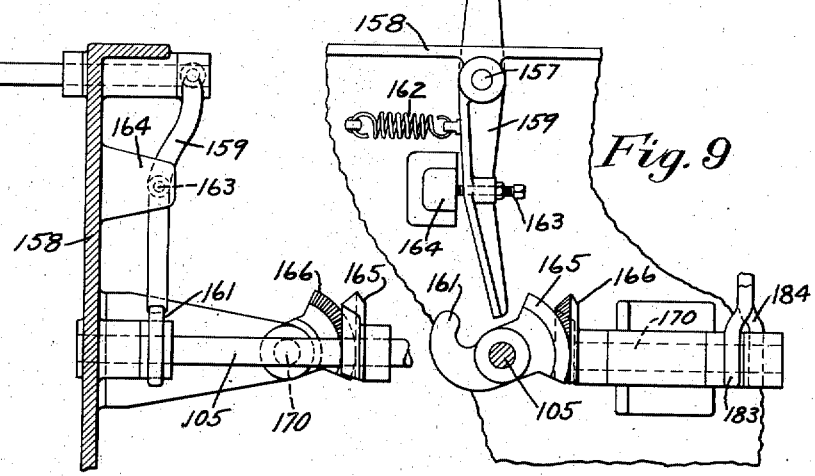

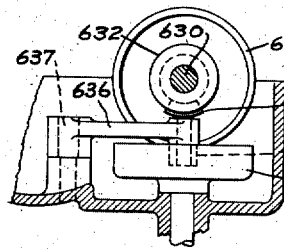
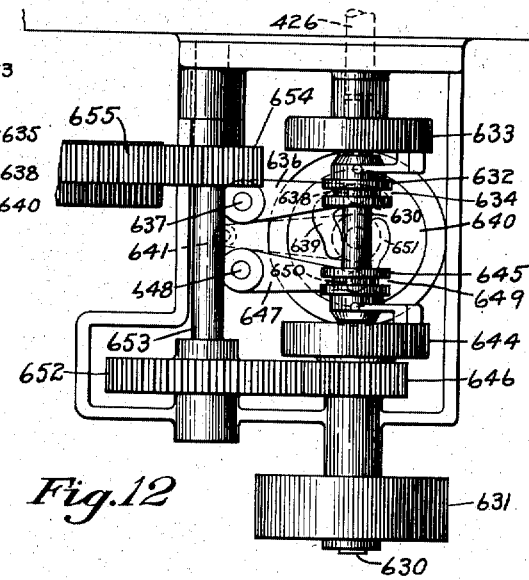
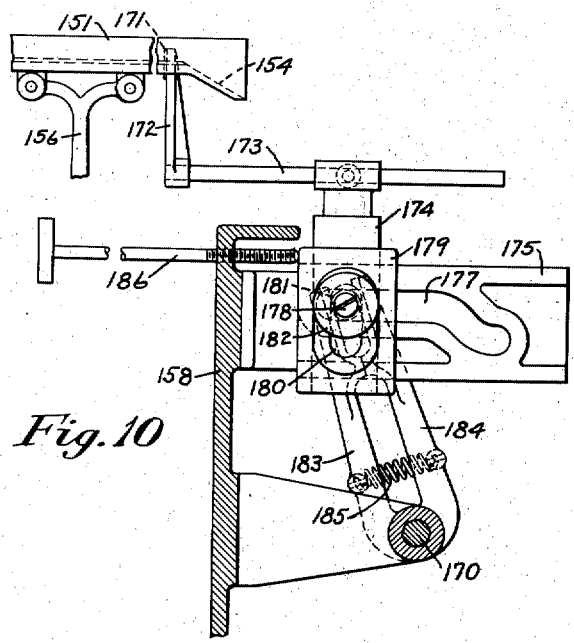
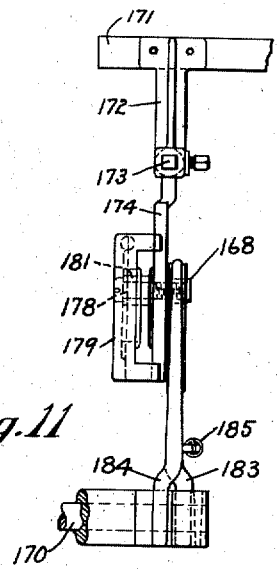

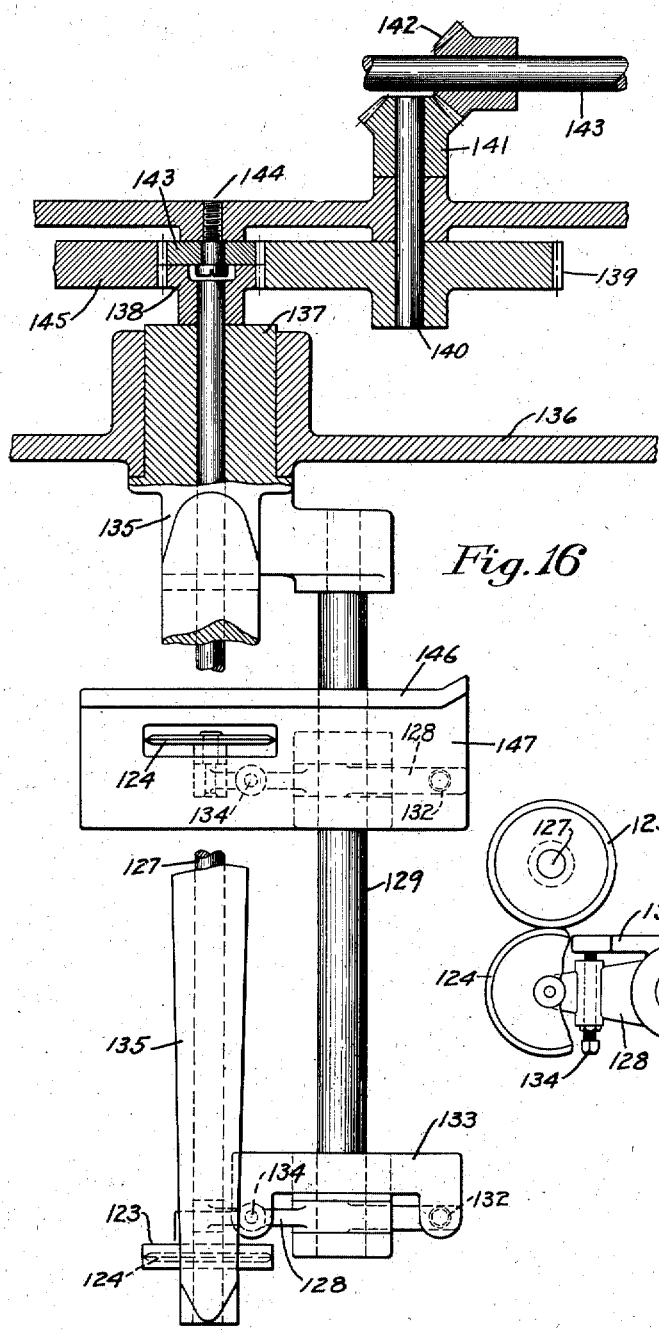

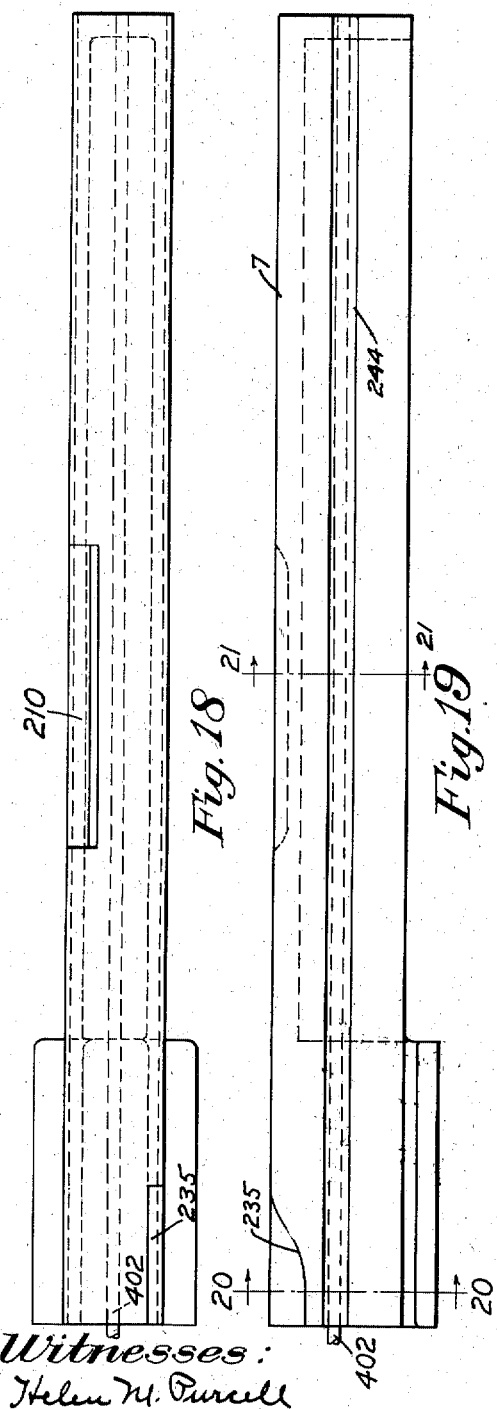
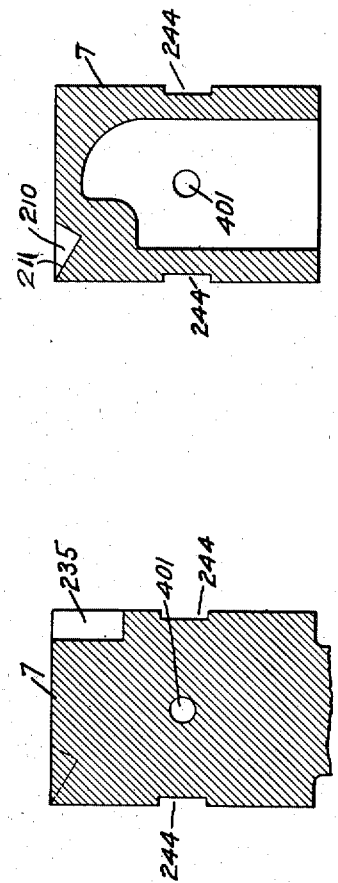

G. A. ROBINSON.
MACHINE FOR FORMING CARTONS.
APPLICATION FILED JULY 7, 1914.
1,205,566.
Patented Nov. 21, 1916.
20 SHEETS—SHEET 11.
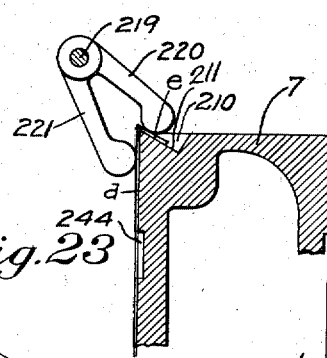
Fig. 23.
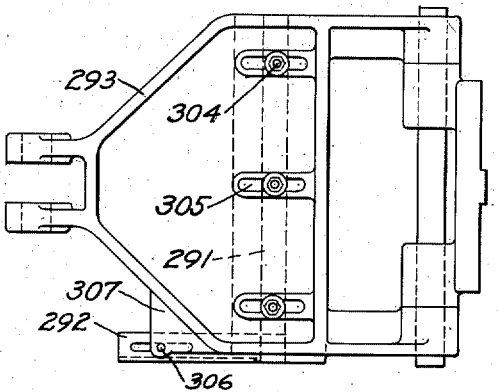
Fig. 24.
Fig. 25.
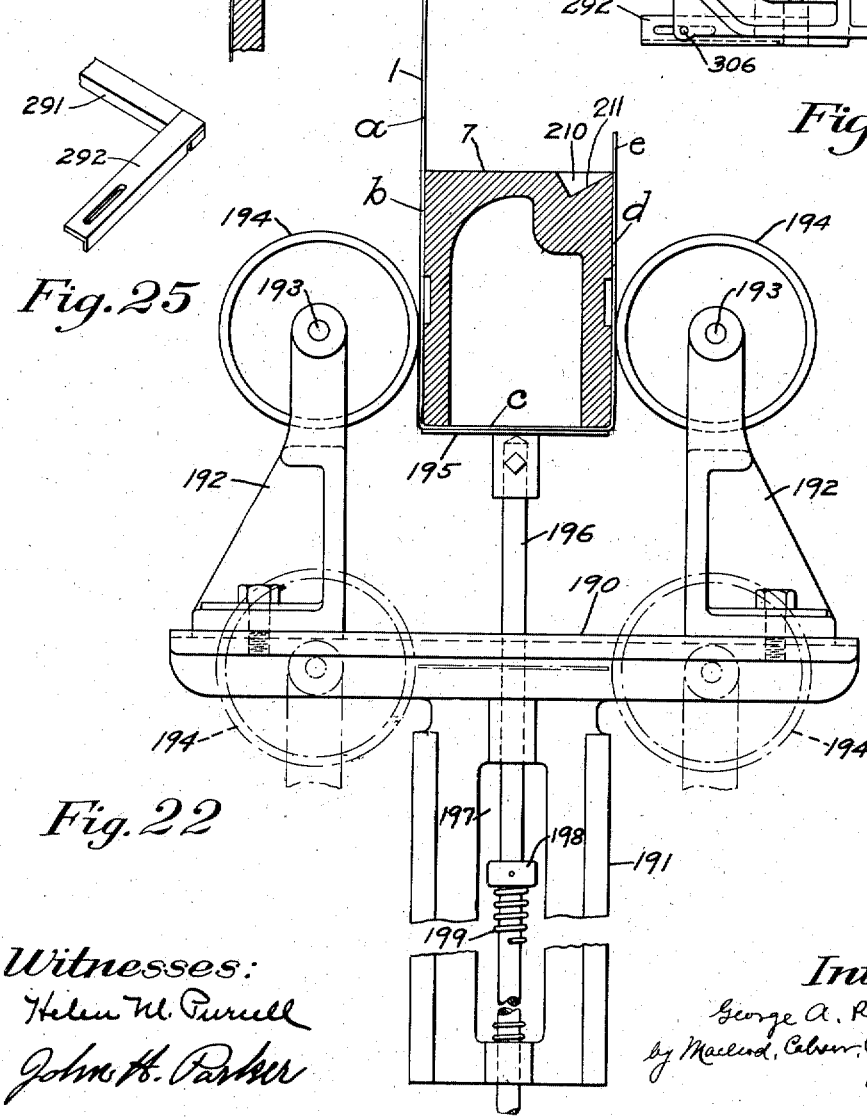
Fig. 22.
Witnesses:
Helen M. Purcell
John H. Parker
Inventor:
George A. Robinson
by Macleod, Calver, Copeland & Dike
Attorneys.

G. A. ROBINSON.
MACHINE FOR FORMING CARTONS.
APPLICATION FILED JULY 7, 1914.
1,205,566.
Patented Nov. 21, 1916.
20 SHEETS—SHEET 12.
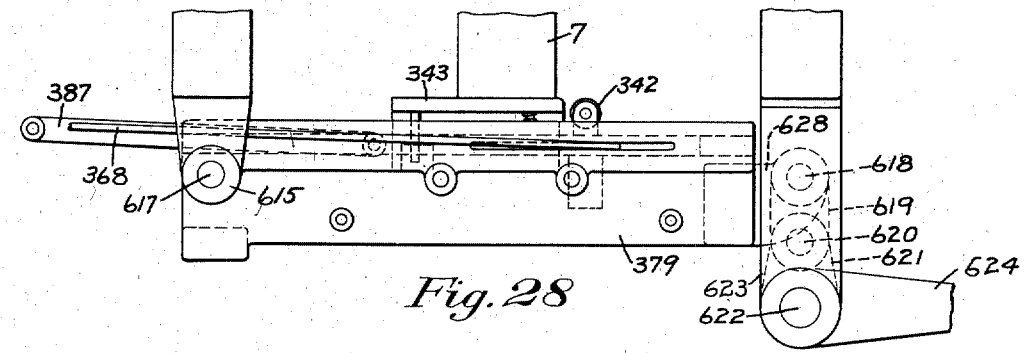
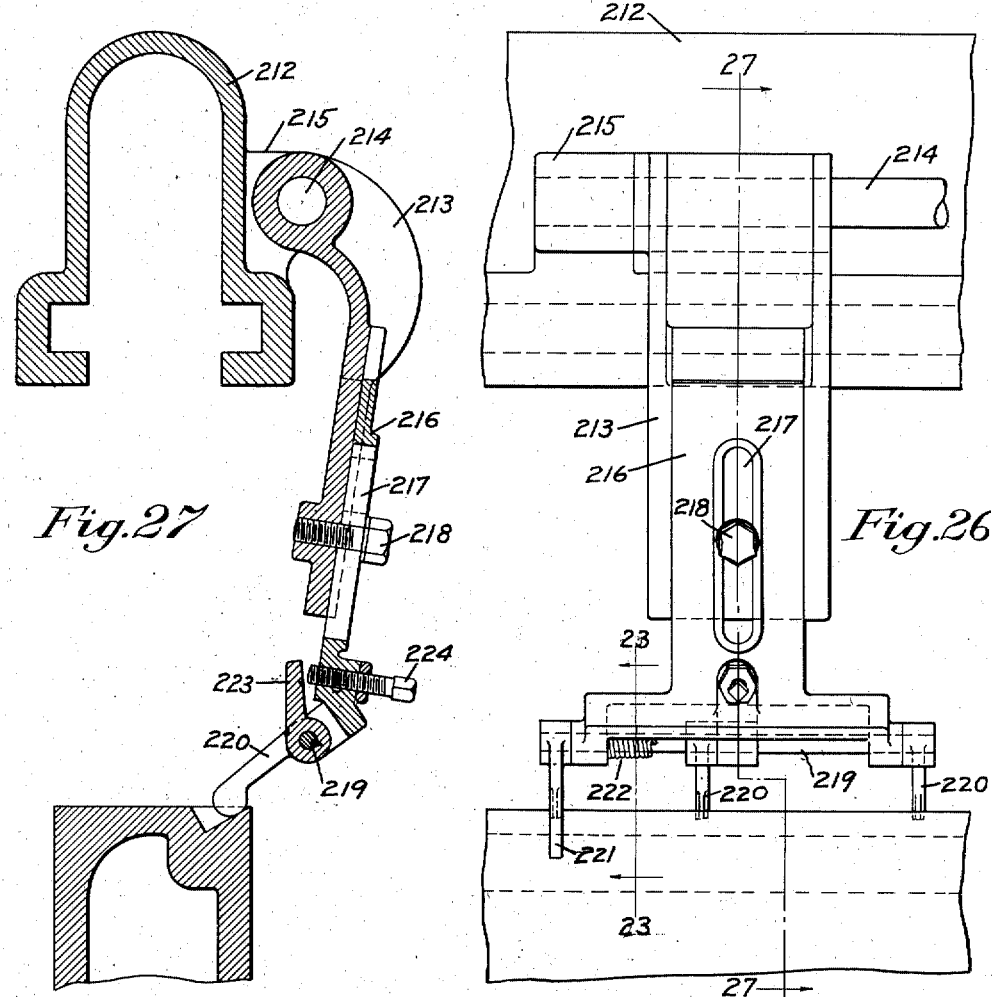

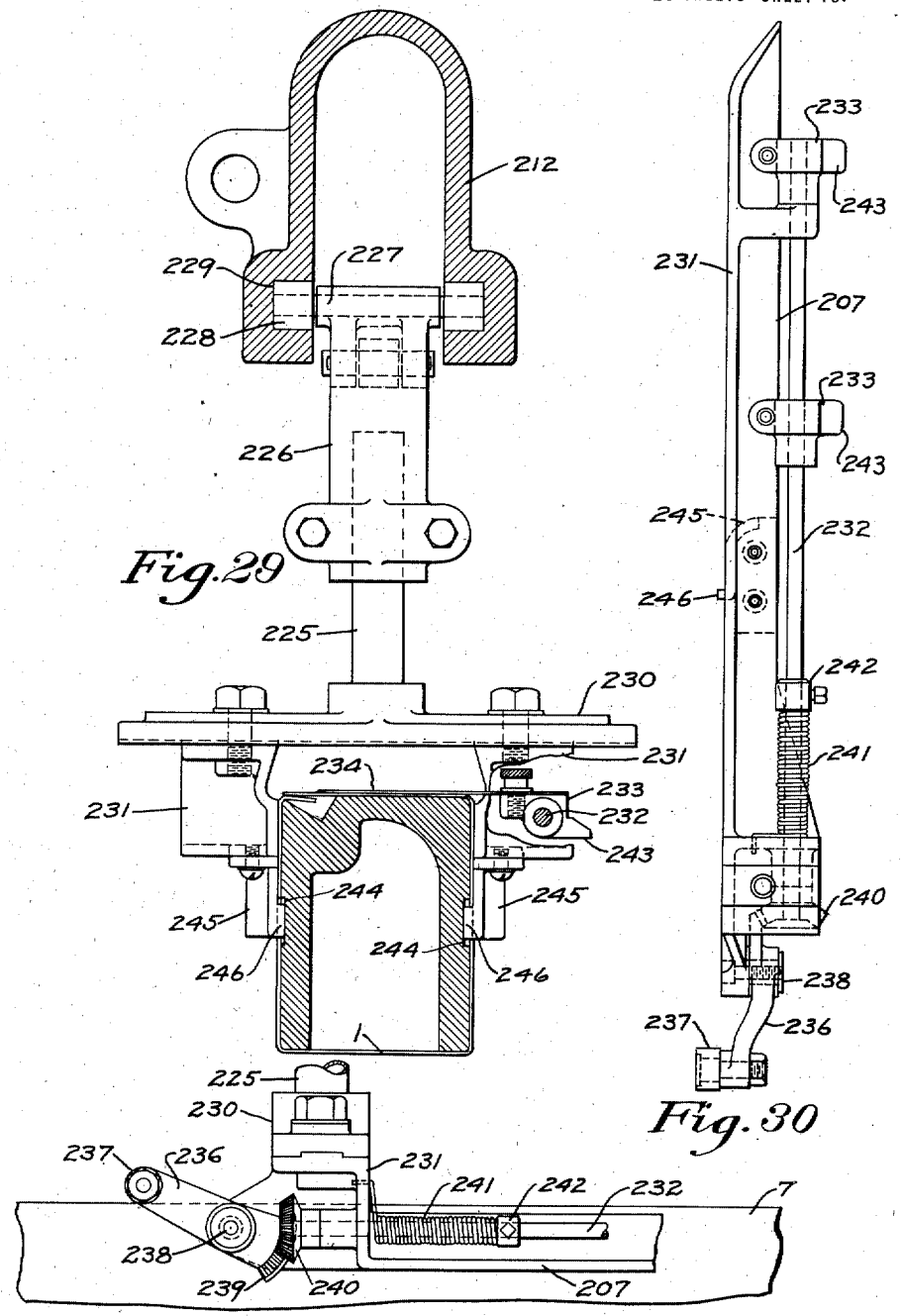

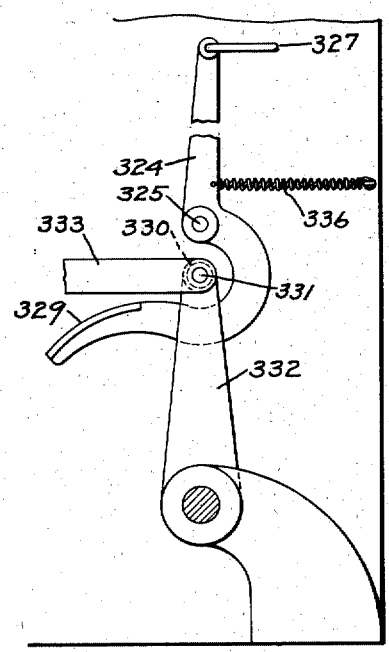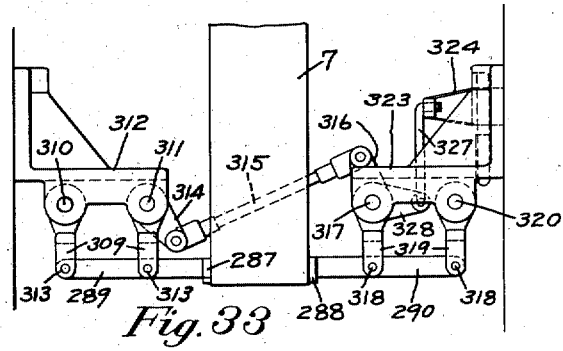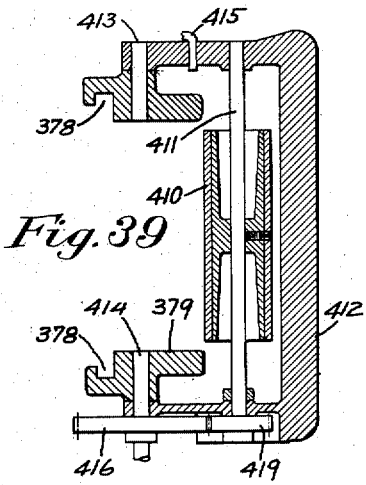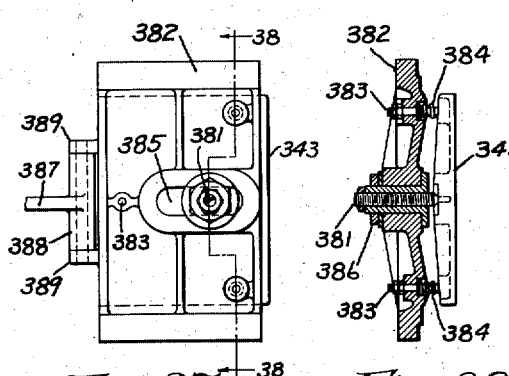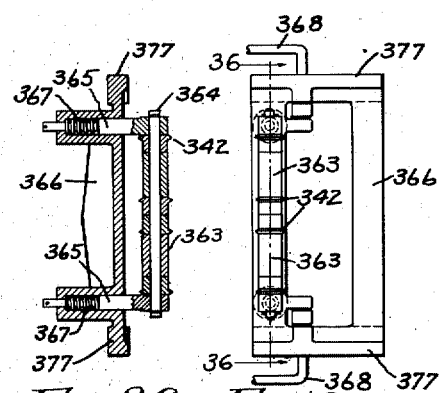

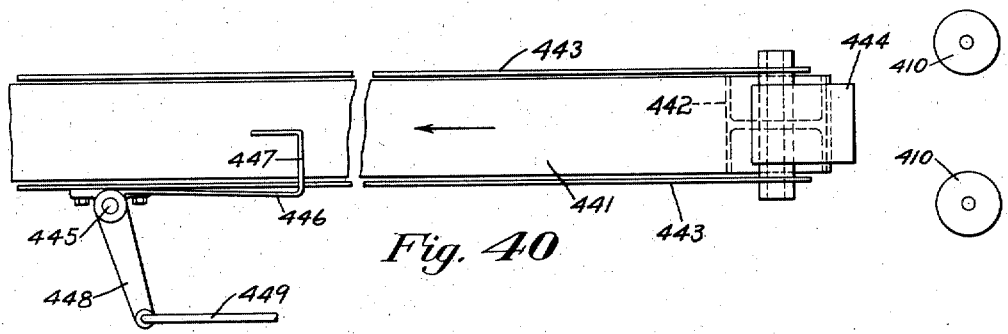
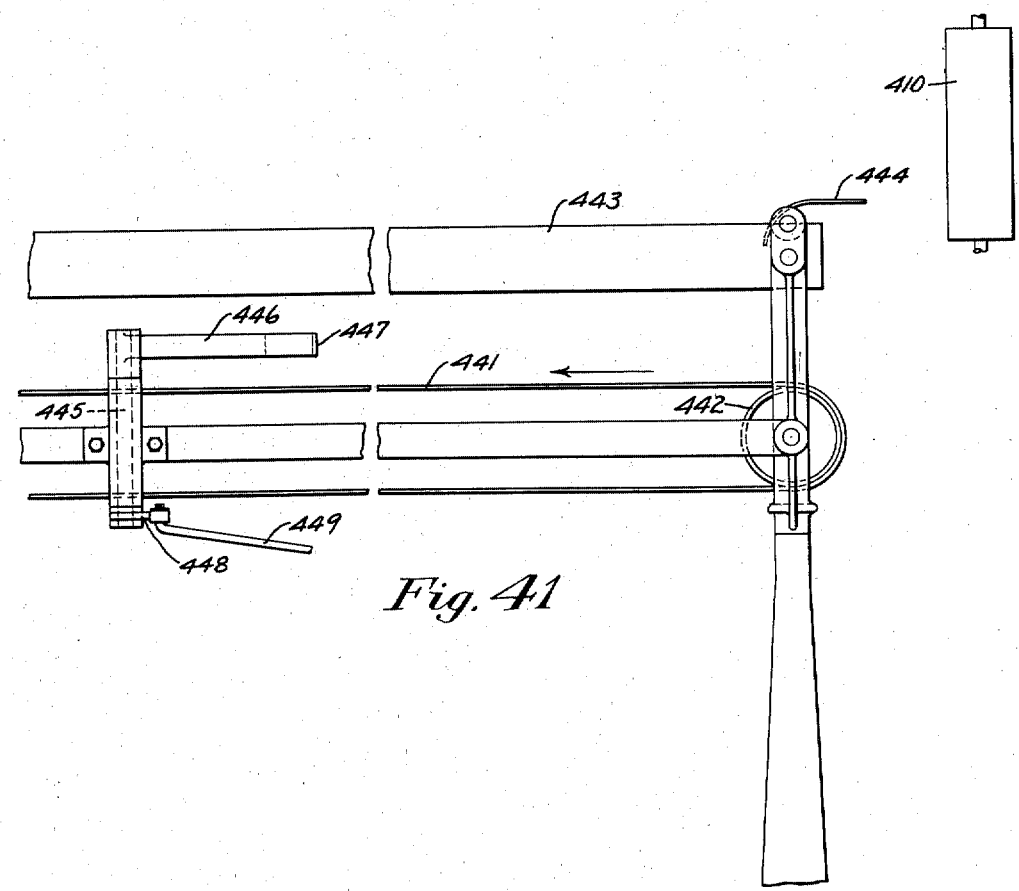

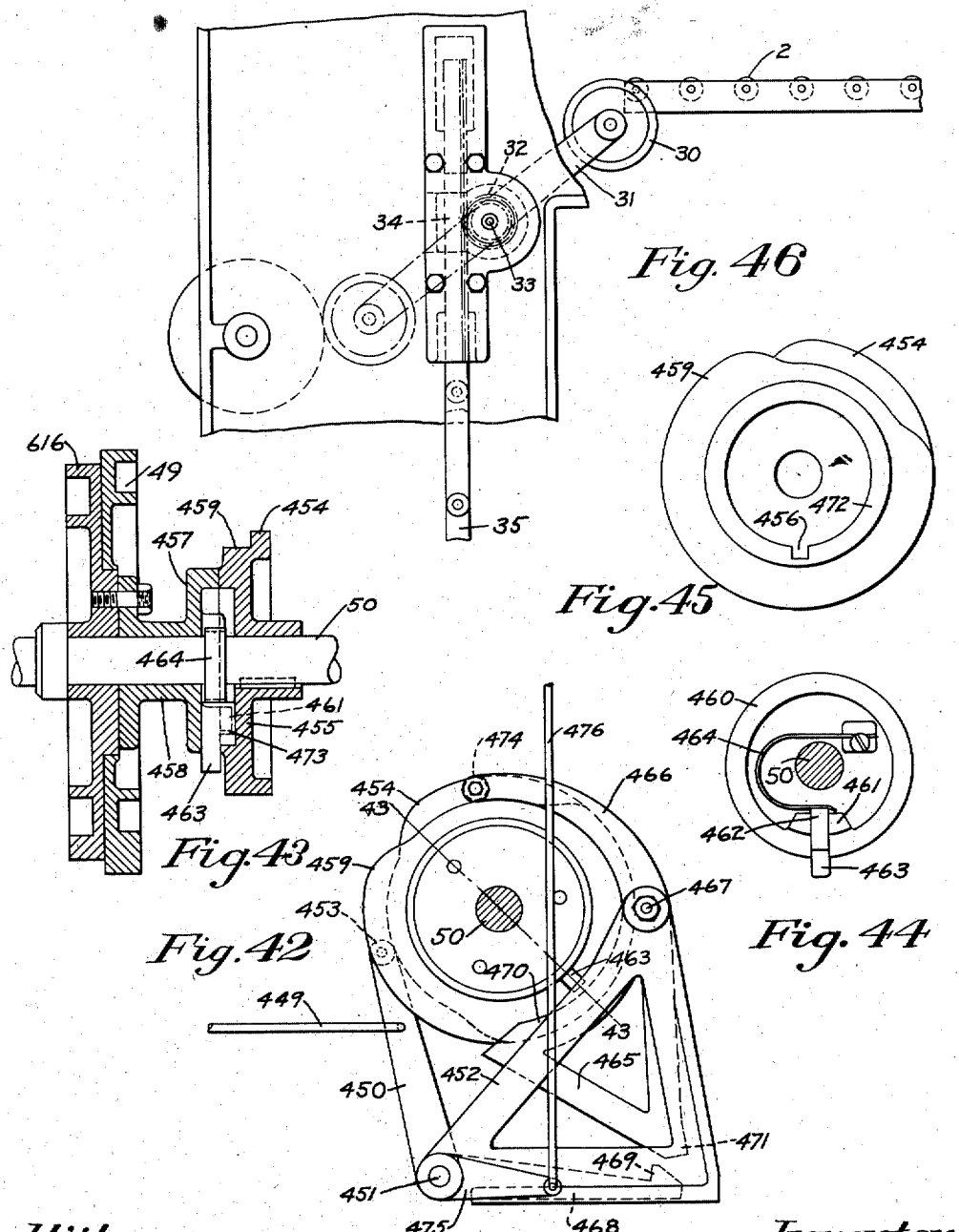

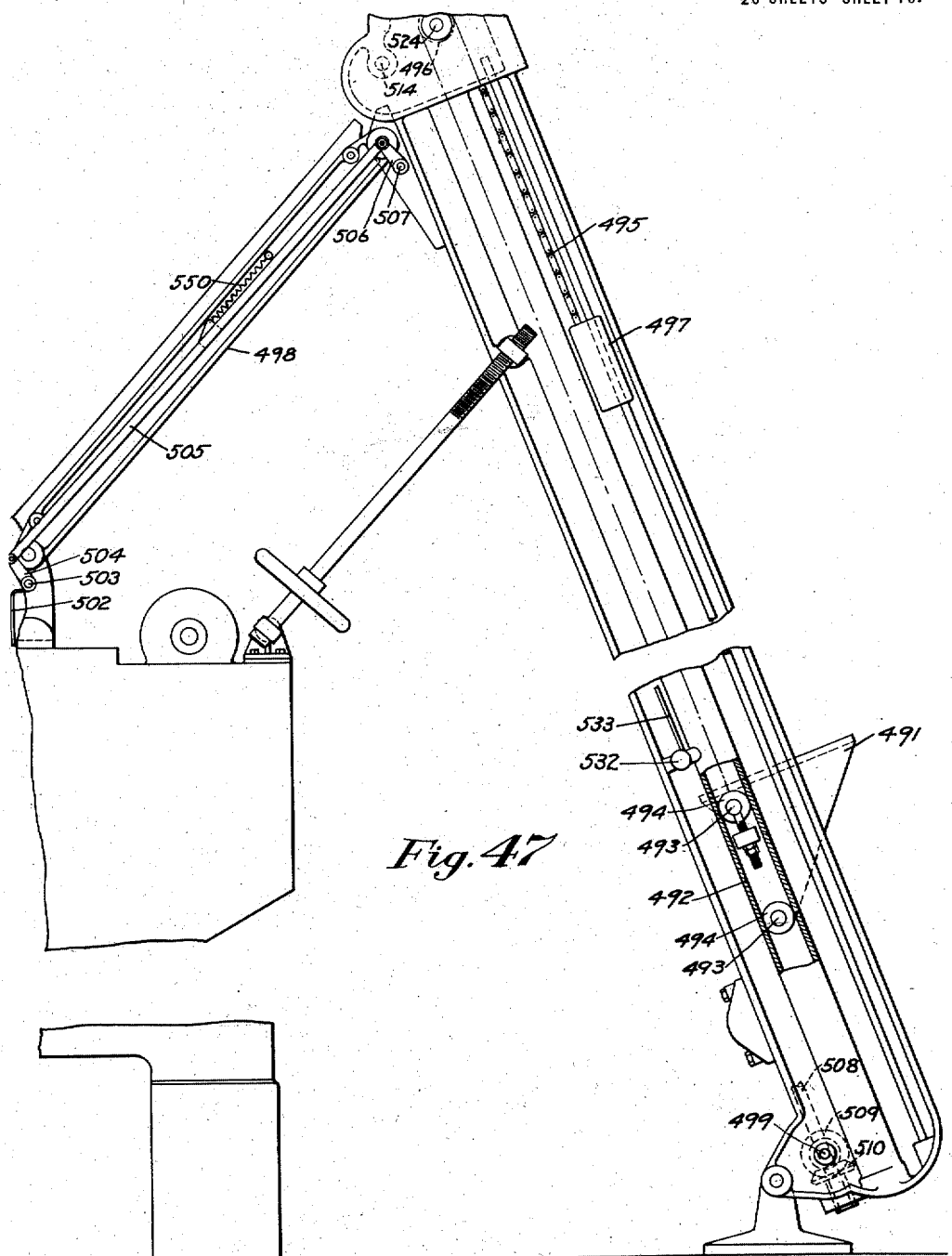

G. A. ROBINSON.
MACHINE FOR FORMING CARTONS.
APPLICATION FILED JULY 7, 1914.

1,205,566.

Patented Nov. 21, 1916.
20 SHEETS—SHEET 19.

Witnesses:
Helen M. Purcell
John H. Parker

Inventor:
George A. Robinson
by Macleod, Calver, Copeland & Dike
Attorneys

UNITED STATES PATENT OFFICE.

GEORGE A. ROBINSON, OF BOSTON, MASSACHUSETTS, ASSIGNOR TO PNEUMATIC SCALE CORPORATION LIMITED, OF QUINCY, MASSACHUSETTS, A CORPORATION OF MAINE.

MACHINE FOR FORMING CARTONS.

1,205,566.  Specification of Letters Patent.  Patented Nov. 21, 1916.

Application filed July 7, 1914. Serial No. 849,396.

*To all whom it may concern:*

Be it known that I, GEORGE A. ROBINSON, citizen of the United States, residing at Boston, county of Suffolk, State of Massachusetts, have invented a certain new and useful Improvement in Machines for Forming Cartons, of which the following is a specification, reference being had therein to the accompanying drawings.

The invention relates to a new and useful improvement in machines for forming cartons and to an improved form of blank out of which the cartons are made. It has especial reference to that class of cartons formed of a single sheet of paper, the blank being folded in a four sided tubular shape, having a sealing lap which is overlapped by the adjacent side panel and having end flaps folded together and sealed to form the bottom of the carton. There are also usually end flaps to close the top of the carton, but these top closing flaps do not have to do with the present invention. Preferably, a special blank which will be hereinafter described, is provided. The blanks are carried from a receiving place by suitable mechanism to a magazine or holder in which they are stacked and from which they are taken one by one. Adhesive is applied to the end sealing flaps and to the side sealing lap and then the blank is transferred to a position beneath a former block, and mechanism is provided for folding the blank in tubular form around the forming block, then transferring it to another position on the forming block where the bottom end closing flaps are folded and sealed, and then the carton is carried away. It may be transferred by the carrier automatically from the carton forming machine to the filling machine or filling and weighing machine or elsewhere, as desired.

The invention will be fully understood from the following description taken in connection with the accompanying drawings, and the novel features thereof will be pointed out and clearly defined in the claims at the close of the specification.

Figure 14:
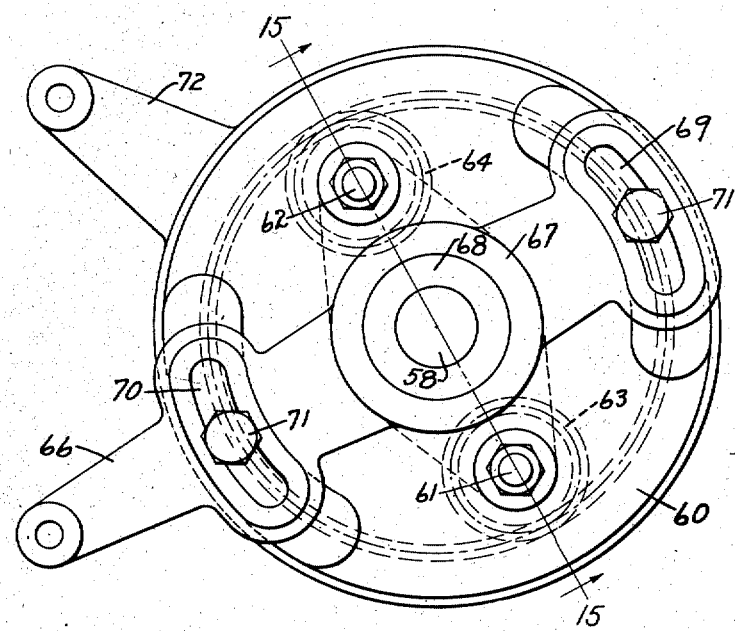
Figure 15:
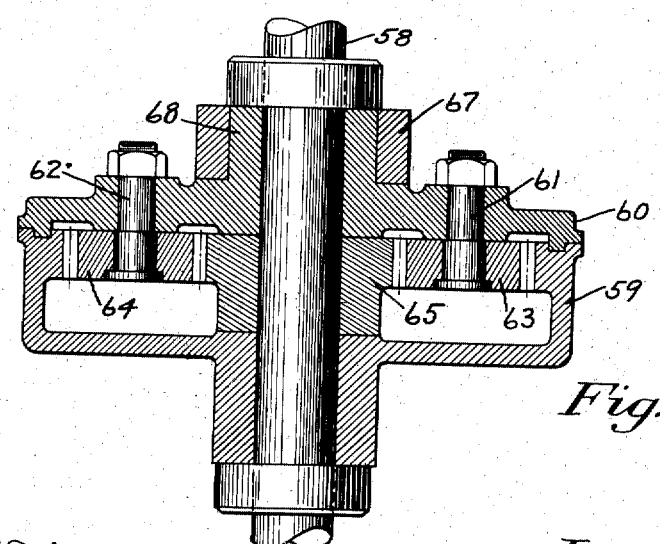
Figure 32:
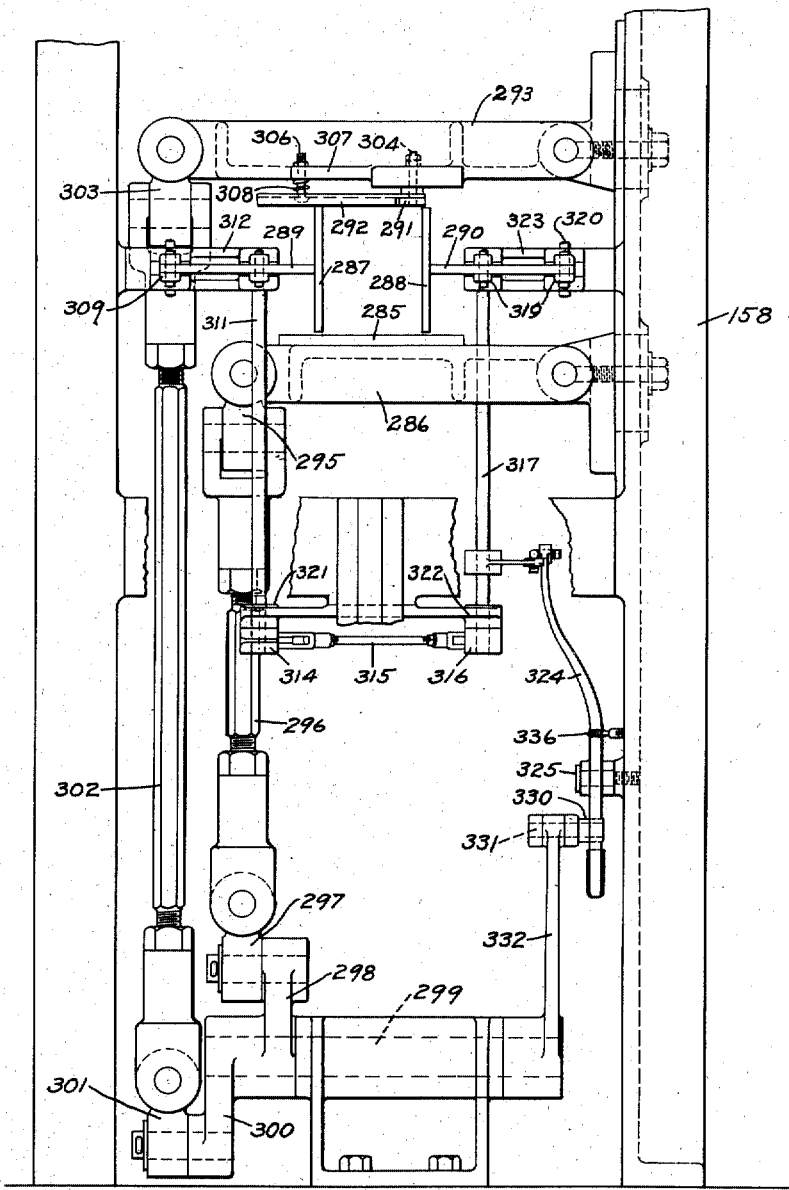
Figure 48:
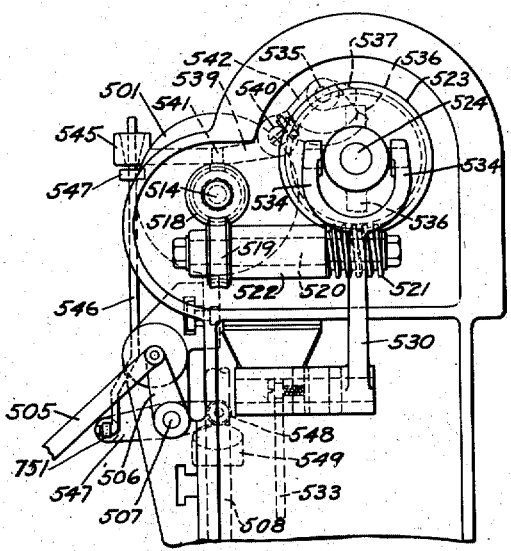
Figure 49:
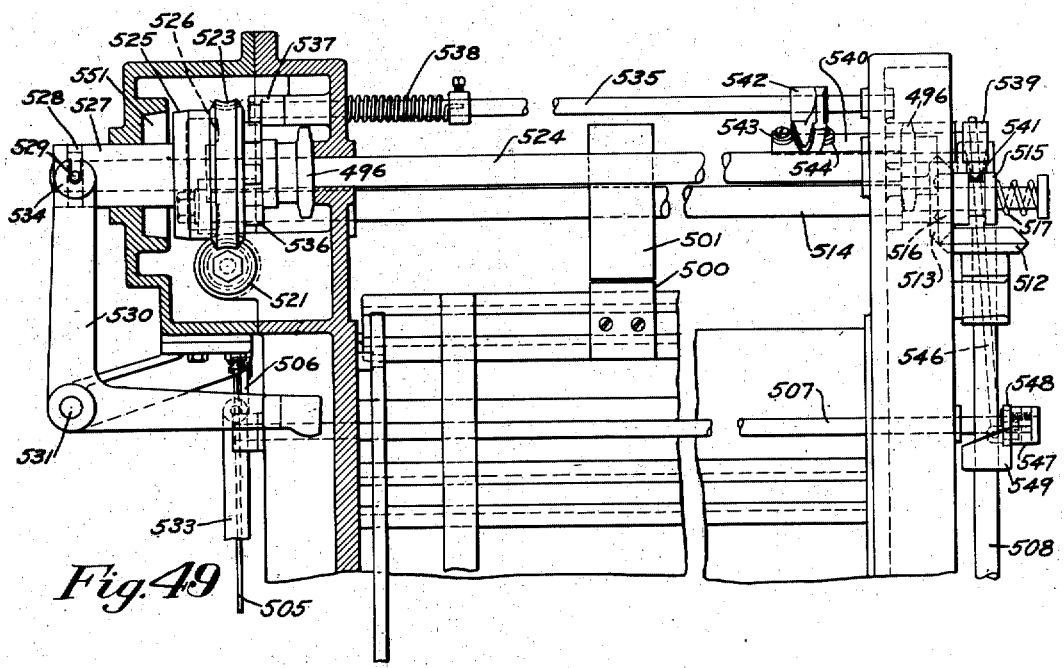
Figure 52:
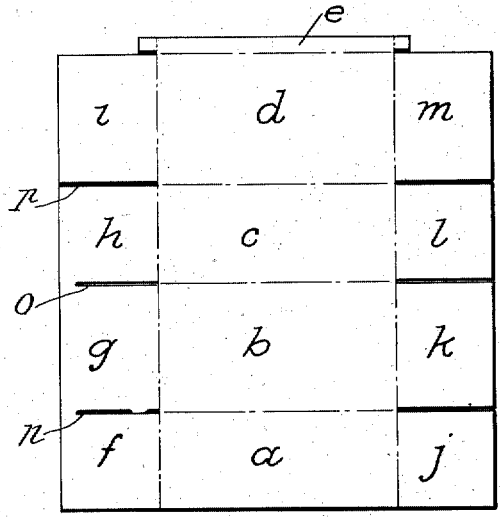
Figures 50, 51:
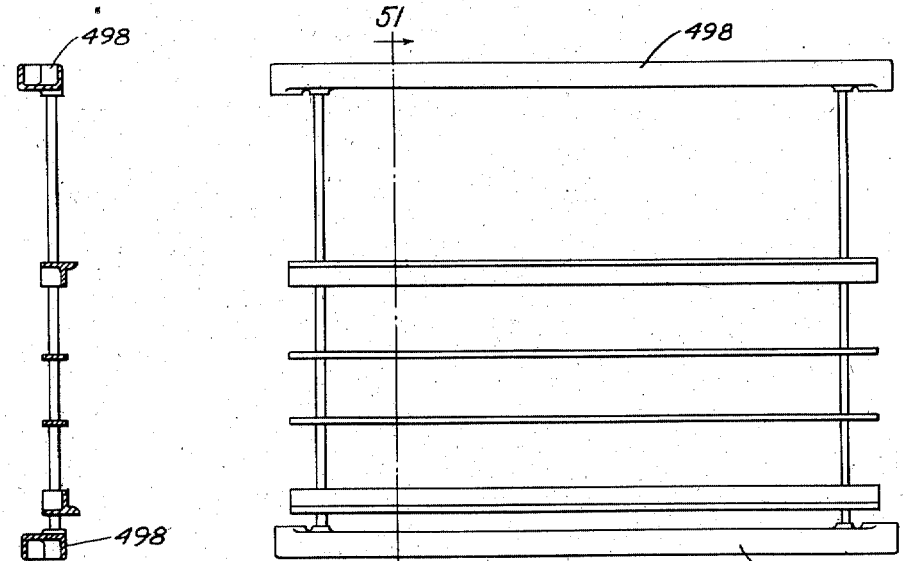

In the drawings,—Figure 1 is a plan view of a machine embodying the invention, the elevator mechanism for carrying the blanks to the holder and certain of the overhead mechanism being removed. Fig. 2 is a right-hand end elevation of the machine shown in Fig. 1. Fig. 3 is a left-hand end elevation and Fig. 4 is a front elevation of the machine. Fig. 5 is an enlarged detail view of the gluing mechanism for the end forming flaps, partly in section. Fig. 6 is an enlarged view of the jaws for withdrawing the blanks from the magazine. Fig. 7 is a section through the case that carries the mechanism which operates the jaws. Fig. 8 is a front elevation of a part of the mechanism for positioning the blanks beneath the forming block. Fig. 9 is a right-hand elevation of the mechanism shown in Fig. 8. Fig. 10 is a front elevation of a portion of the mechanism for positioning the blanks beneath the forming block, showing some elements not shown in Fig. 8. Fig. 11 is a right-hand elevation of the mechanism shown in Fig. 10. Fig. 12 is a plan of the clutch driving mechanism. Fig. 13 is a side elevation, partly in section, of a portion of the mechanism shown in Fig. 12. Fig. 14 is a side elevation, enlarged, of a portion of the mechanism for driving the jaws that withdraw the blanks from the magazine. Fig. 15 is a section on line 15—15 of Fig. 14. Fig. 16 is a plan, partly in section, showing the mechanism for transferring the blanks to the forming block. Fig. 17 is an elevation showing one pair of the rolls shown in Fig. 16. Fig. 18 is a plan of the forming block. Fig. 19 is a side elevation of the forming block. Fig. 20 is a section on line 20—20 of Fig. 19. Fig. 21 is a section on line 21—21 of Fig. 19. Fig. 22 is an elevation, sectioned through the forming block, showing the means for folding two side panels of the carton. Fig. 23 is a section on line 23—23 of Fig. 26. Fig. 24 is a detail plan view of the top pressure member for sealing the side lap. Fig. 25 is a detail view of some of the parts shown in Fig. 24. Fig. 26 is an elevation of the mechanism for folding the sealing lap. Fig. 27 is a section on line 27—27 of Fig. 26. Fig. 28 is a plan view of the mechanism for applying pressure to the folded end closing flaps. Fig. 29 is an elevation partly in section showing the mechanism for folding the last panel for the body of the carton, and the mechanism for transferring the folded body to the end of the forming block where the end flaps are to be folded. Fig. 30 is a plan view of the right-hand portion of the parts shown in Fig. 29, the folder plate being removed. Fig. 31 is a side elevation of a part of the mechanism shown in Fig. 30, showing the mechanism for operating the folder plate. Fig. 32 is an end view showing the mechanism for clamping the tubular body of the carton to the forming block after the carton has been transferred to the end of the block ready to have the end flaps folded and also the mechanism for applying pressure to the sealing lap. Fig. 33 is a plan view showing the mechanism for clamping the two side panels to the block when in position for folding the end flaps. Fig. 34 is a side elevation of the mechanism for operating the clamping means shown in Fig. 33. Fig. 35 is a front elevation of the mechanism for folding one of the end forming flaps. Fig. 36 is a section on line 36—36 of Fig. 35. Fig. 37 is a front elevation of the mechanism for folding the last end closing flap. Fig. 38 is a section on line 38—38 of Fig. 37. Fig. 39 is a sectional view of one of the stripping rolls which strip the carton from the forming block. Fig. 40 is a plan of the conveyer, showing the stop controlling finger. Fig. 41 is a side elevation of the parts shown in Fig. 40. Fig. Fig. 42 is an elevation showing the mechanism for controlling the stopping and starting of the blank feeding mechanism. Fig. 43 is a section on line 43—43 of Fig. 42 and showing the cams for operating the gluing pad and separating fingers. Fig. 44 is a detail view of the latch mechanism shown in Fig. 42. Fig. 45 is a detail view of the cam shown in Fig. 42. Fig. 46 is a side elevation showing the mechanism for applying glue to the sealing lap. Fig. 47 is an elevation showing the elevator machanism for supplying blanks to the magazine. Fig. 48 is a front elevation of the upper part of the elevator mechanism, as viewed in Fig. 47. Fig. 49 is a side elevation of the upper portion of the elevator mechanism, as viewed from the right-hand of Fig. 47. Fig. 50 is a plan view of the chute for the blanks from the top of the elevator to the magazine. Fig. 51 is a section on line 51—51 of Fig. 50. Fig. 52 is a plan of a blank especially adapted for use with the machine.

In order to better understand the machine, attention is first directed to the preferred form of blank to be employed, and as shown in Fig. 52. The said figure shows the under face of the blank which will be the outer face after the blank is folded on the former block. The blank 1 is cut and scored to form four panel portions $a$, $b$, $c$, $d$ which are to form the four panels of the box, a side sealing lap $e$, four end flaps $f$, $g$, $h$, $i$ to form the bottom of the carton, and four end flaps $j$, $k$, $l$, $m$ to close the top of the carton after it is filled. The blank is scored along the lines indicated by the dotted lines, to facilitate folding, and the full lines between the end closing flaps indicate where it is cut through. It is to be noted that the lines of cut $n$, $o$, between the flaps $f$ and $g$ and between $g$ and $h$ respectively do not extend quite to the outer edge of the flaps, so that there is still a slight union between said flaps $f$, $g$, $h$ which can be easily severed at the proper time, while the line of cut $p$ between the flaps $h$ and $i$ and the line of cut between all of the top closing flaps are cut clear to the outer edge. The reason for this is that it is desired to retain the flaps $f$, $g$ and $h$ all in better supporting connection with each other and to prevent one of said three end flaps from dropping one below the other when they project from the holder or magazine preliminary to being drawn out from the holder, as will appear more clearly in the description hereinafter. It is not necessary to make any special provision for the flap $i$.

The holder or magazine in which the blanks 1 are stacked up consists of a plurality of horizontal rolls 2 spaced apart from each other in form of a grid on which the pile of blanks rests, and four upright corner posts 3 consisting of angle bars which have wings at right angles to each other so that each post will have faces which engage two edges of the blank. The rolls 2 are mounted in vertical plates 4 which are supported by studs 5 projecting from side walls 6 which form a part of the frame of the machine. The blanks are supported on rollers so that the bottom blank may be more easily drawn out from beneath the weight of the other blanks in the stack. It will be noted from the plan view, Fig. 1, that when the blanks are in the stack the bottom end closing flaps project beyond the supporting rolls 2 of the holder and are unsupported on their under side.

The elevator mechanism for keeping the magazine supplied with blanks is shown in Figs. 47–51 and will be more particularly described hereinafter, as it is actuated in connection with the folding and sealing mechanism which should be first described.

The forming block 7 extends transversely of the machine from front to rear as viewed in Fig. 1 and the blanks have to be transferred from the magazine already described to a position beneath the forming block where the panel flaps are folded around the forming block in four sided tubular form and sealed and then the folded tubular blank is moved along on the forming block around which it is wrapped to the front end where the bottom end closing flaps are folded and sealed. The gluing of the side sealing lap and of the bottom end closing flaps however takes place before the blank is carried to the forming block, and just before it leaves the magazine. The gluing is all performed on the outer faces of the flaps, that is, on the faces which when the blank is folded will face outward from the block, rather than toward the block so that the block will not become smeared with glue.

The lowermost blank in the stack is first glued as to its bottom forming end flaps, $f$, $h$, $i$, while the blank is still in the stack, then separator fingers are inserted between the projecting flaps $f$, $h$ of the lowermost blank and the blank above it, and a gripper advances and seizes the blank by the unglued flap $g$ and pulls it out from the stack, and while this is being done the side sealing lap $e$ is glued, and then the blank is carried to the former block. The mechanism for doing this work will now be described. See particularly Figs. 1, 2, 5–17.

A shaft 8 is journaled in two parallel bars 9, 10 which are tied together and form a reciprocable carriage, the bars 9 and 10 of the said carriage being formed for a portion of their length with teeth which engage respectively with spur gears 11, 11 mounted on a rocker shaft 12 whereby a reciprocating movement is given to the carriage.

The rocker shaft 12 is actuated by mechanism as follows,—(see Figs. 1 and 2). A spur gear 611 is mounted on shaft 12. A segment gear 612 is mounted on a rocker shaft 629 and engages with said spur gear 611. A lever 613 is made fast at one end on said rocker shaft 629 and its other end is pivotally connected with one end of a rod 614 whose lower end is connected with a lever 615 fulcrumed on shaft 607 having a roll which engages with a cam path in one face of a cam 616 on shaft 50.

Mounted on the shaft 8 is a spur gear 13 which engages with a stationary rack 14 so that as the carriage 9, 10 reciprocates, the shaft 8 will rotate in one direction or the other according to the direction of travel of the carriage. (See Fig. 5.) Mounted fast on shaft 8 is a yoke lever 15 which carries a pad holder 16 having a segmental face on which are mounted the segmental gluing pads 18, 19 which serve to apply adhesive to the flaps $f$, $h$ and $i$, of the blank. The pad 18 is of a suitable width and location on the holder to apply adhesive to the flap $f$, and the pad 19 is of a greater width so as to apply adhesive to the two adjacent flaps $h$ and $i$. The outer periphery of these pads is concentric with the shaft 8. As the carriage reciprocates, the engagement of the gear 13 with the rack 14 will cause the pads to swing around in the arc of a circle.

Mounted on a shaft 20 journaled in the frame of the machine is a glue feed roll 21 which dips into a glue receptacle 22. Said glue feed roll 21 is continuously driven. A gluing roll 23 is journaled in the swinging ends of the two parallel levers 24 which are respectively pivoted at their other ends to the carriage. A spring 25 under tension fastened at one end to the bar 9 and fastened at its other end to one of the levers 24 and a similar spring connected with the bar 10 and the other lever 24 tend to pull the levers 24 and the roll 23 upward. A stop screw 26 limits the upward position of each of the levers 24 and roll 23. Said stop screws 26 are mounted in brackets 27 which are adjustably secured to the bars 9, 10 respectively by means of screws 28 which engage respectively with a horizontally elongated slot 29 in the bracket. When the carriage 9, 10 is in its rearward position as shown in Fig. 2, the gluing roll 23 will bear against the glue feed roll 21 and the gluing pads will extend rearwardly. When the carriage moves forward, that is, to the right as viewed in Fig. 2, the glue pad holders and pads will, by reason of the rotary movement of the spur gear 13, sweep forward and then up and over into the position shown in Fig. 5, and in so doing the outer faces of the pads will wipe along over the periphery of the glue feed roll 23, the said glue feed roll yielding backward to permit the pads to sweep past, and then the springs 25 will bring the levers 24 and pads back into the position shown in Fig. 5 with the levers 24 bearing against the stop screws 26. The driving mechanism of the carriage 9, 10 is geared in such manner that the surface speed of rotation of the pads 18, 19 will be the same as the speed of horizontal travel of the carriage. When the carriage moves forward, that is, to the right as viewed in Fig. 2, the continued onward movement of the carriage will bring the pads into the position shown in Fig. 5, and in so doing the pads will wipe the under surface of the flaps $f$, $h$, $i$, and on the return movement of the carriage the pad holders and pads will rotate backward.

A narrow glue roll 30 of sufficient width of periphery to glue the narrow sealing lap $e$ is journaled on one end of a lever 31, the other end of said lever being mounted on a rocker shaft 33 in the frame of the machine. Means are provided for rotating the shaft 33 in a direction to swing the lever 31 forward and up to bring the glue roll 30 into position where when the lowermost blank is drawn out from the holder after the end forming flaps have been glued the sealing lap $e$ will trail over the periphery of the glue roll 30 and thereby apply a stripe of adhesive to the said lap, and the return rocking movement of the shaft 33 will bring the roll 30 back into engagement with the glue feed roll 21. The mechanism for thus rocking the shaft 31 is as follows:

On the other end of shaft 33 from that which carries the glue roll 30 there is mounted a spur gear 32 which engages with a vertical rack 34, (see Figs. 2 and 46) which moves in guide ways in the frame. One end of a connecting rod 35 is pivotally connected with the lower end of rack 34, the other end of said rod being pivotally connected with an arm 36 mounted on a rocker shaft 37. An arm 38 also fast on said rocker shaft 37 is pivotally connected with one end of a rod 39, the other end of said rod being connected with a cam lever 601 which is pivoted at 602 and carries a roll 603 which engages with a cam 604 on shaft 50.

The means for gripping and pulling out the glued bottom blank from beneath the others consists of two jaws, 40, 41, the lower one of which, 40, is mounted on a lever 42, pivoted on shaft 43 mounted in a holder 44 (see Fig. 6) so as to open and close with relation to the upper jaw 41 which is fixed so far as opening and closing is concerned. The fixed upper jaw 41 is secured to the angular holder 44 consisting of two parallel vertical plates which form opposite ends of the holder and in which the shaft 43 is mounted. The jaws and holder are mounted on a reciprocable carrier which moves them up to grip the blank and back again with the blank.

In order not to smear the jaws with the glue, they are arranged to grip the unglued flap $g$, only, and means are provided to complete to the outer edge the slits $n$, $o$, which are between the flap $g$ and the adjacent flaps $f$, $h$ respectively at the same time that the flap $g$ is seized by the jaws, as there is no further need of retaining the connection. For this purpose, the fixed jaw 41 is provided with cutter blades 45 at opposite sides of the jaw between which the movable lower jaw 40 enters when the jaw closes. The cutters 45 are spaced just far enough apart to aline with the slits $n$, $o$, so as to complete the cut on the same line, but the jaws will close in on the flap $g$ and firmly grip it.

As the blanks lie in the stack, the flaps of the lowermost blank are overlaid by the flaps of the blank above and it is necessary to in some way provide a clearance space between the flap $g$ and the overlying flap in order to permit the upper jaw of the gripper to enter and obtain a grip. Advantage is taken of the fact that as the glue pads 18, 19 roll over the flaps $f$ and $h$ the glue will cause the flaps to slightly adhere to the pads and be pulled down. This allows the insertion of a lever between the glued flaps $f$, $h$ and the overlying flaps of the carton above it so as to lift the overlying flaps enough to admit the upper jaw 41.

The mechanism shown for lifting the overlying flaps as above described is as follows: Levers 46 mounted on a rocker shaft 47 are each formed with a foot 48, and so located that they will be rocked by the shaft 47 in such a way as to cause the feet of the levers to enter between the slightly downwardly curled glued flaps $f$, $h$ and the flaps of the overlying blank after the flaps have been glued but before the jaws 40, 41 have advanced far enough to grip the flap $g$, and by the time the jaw 41 is ready to pass between the flap $g$ and its overlying flap, the said overlying flap will be lifted in the manner above described. This shaft 47 is actuated by means of a cam 49 on shaft 50, acting through lever 51 which has at one end a roll 52 engaging with the said cam, its other end being fast on a rocker shaft 605. Mounted on said rocker shaft is a lever 53 whose other end is pivotally connected with one end of a rod 54 which in turn is pivotally connected with an arm 606 on shaft 47.

The carrier for the gripper jaws, when in its starting position, is at a point intermediate its most forward and its most backward position, and it first moves forward to grip the blank, then it moves back to the rearmost position, to pull the blank clear of the stack so that the ungripped end of the blank will fall onto a movable support beneath, then the carrier will move forward again still gripping the blank and pushing it along on said support beneath the stack holder, moving nearly as far forward as on its first forward stroke, but preferably not quite as far, so as to position the blank on said support while the support is stationary, then the jaws will relax their grip and the carrier will move back to its original starting position ready for the next blank. The said movable support will be caused to descend and deposit the blank on a track and mechanism will then cause it to be positioned beneath the former block ready to be folded.

Before proceeding with the description of the folding mechanism the jaw carrier and its actuating mechanism and the said movable support will be more particularly described. The jaw carrier consists of a box 55 mounted on tie rods 85 which are carried by two reciprocable racks 56 and which are actuated by gears 57 mounted on a rocker shaft 58 whose rocking is produced by mechanism to be hereinafter described so as to give the necessary throw of varying stroke to the jaw carrier previously referred to. See Figs. 1, 2, 4, 6, 7.

An internal gear 59 and a plate 60 are both loosely mounted on shaft 58 and are dovetailed together by a sliding tongue and groove fit so that one may rotate independently of the other. See Figs. 14 and 15. Two studs 61, 62 pass through the plate 60 diametrically opposite to each other, being firmly clamped to the plate by a nut on the threaded end thereof and a shoulder which is drawn against the inner face of the plate when the nut is set up. Two pinions 63, 64 are mounted loosely on said studs 61, 62, respectively, and both pinions engage with a pinion 65 fast on shaft 58.

A lever 66 is formed with a bearing 67 through which the hub 68 of the plate 60 passes loosely, the said lever having arms with elongated segmental slots 69, 70 concentric with the shaft 58 and diametrically opposite each other. The lever 66 is clamped to the plate 60 by bolts 71 which pass through the said segmental slots and into the plate 60. The elongated segmental slots permit adjustment of the lever 66 with relation to the plate 60.

Lever 66 is pivotally connected with one end of a connecting rod 73, (see Fig. 2) the other end of said rod being connected with one arm of a bell crank lever 74, fulcrumed on stud 75, the other arm of said bell crank 74 being pivotally connected with one end of a connecting rod 76, whose other end is pivotally connected with one end of a lever 77, said lever 77 being fulcrumed at its other end on a stud 607 and carrying intermediate its ends a roll which engages with a cam path in a double cam 608 on shaft 50, which thereby actuates the lever 66, plate 60, pinions 63, 64, and 65, and shaft 58, the internal gear 59 being controlled by the arm 72 and its connections.

The lever arm 72 which projects from the internal gear 59 is connected pivotally with one end of a connecting rod 78 whose other end is pivotally connected with one end of a lever 79 which is fulcrumed at its other end on stud 607 and carries intermediate its ends a roll which engages with a cam path in said double cam 608 on shaft 50. This last cam through its said connection actuates lever 72, internal gear 59, pinions 63, 64 and 65 and shaft 58. The rotation of shaft 58 actuates gear 57, racks 56 and the jaw carrier.

Said cam 608 which actuates the lever 66 and the lever 72 makes one rotation for each complete four part cycle of movement of the jaw carrier previously described. The cam is so constructed as to its acting faces that the cam face which actuates the internal gear 59 will rotate shaft 58 first in a direction and through an arc sufficient to give the jaw carrier the forward stroke from its initial position far enough to bring the grippers to engage the blank, then rotate the shaft in the reverse direction and at the same time that the internal gear begins its reverse movement, the plate 60 will begin to rotate in a direction opposite to the rotation of the internal gear, and their combined movement will bring the jaw carrier back to the full rearward position, thus drawing the blank completely out of the pile. Then the continued action of the cam 608 will cause the plate 60 and internal gear 59 to reverse their directions of rotation and reverse the rotation of shaft 58, and move the jaw carrier forward nearly to the same forward position where it gripped the blank, but not quite so far forward, then back to the starting point by the action of the internal gear 59.

The jaws are normally retained closed. Means are provided to open the jaws on the first forward stroke so as to receive the flap of the blank between them, then to close the jaws onto the flap and retain the grip until the end of the second forward stroke, that is, until the blank is deposited on the tilting support beneath the magazine or stack holder. The said mechanism is as follows: A lever 80 is made fast to shaft 43 on which the movable jaw 42 is mounted. Said lever is pivotally connected with one end of a rod 81 whose other end is pivotally connected with one end of a lever 82 which is mounted fast on a rocker shaft 83. The connecting rod 81 thus makes a sort of toggle joint with the lever 82, and when the rod 81 and the lever 82 are in a straight line with each other as shown in full lines in Fig. 7 the jaws 42, 45 will be closed together. A spring 84 coiled around the shaft 83 and connected at one end with the lever 82 and connected at its other end with a stud is under tension and tends to hold the toggle joint in the position for closing the jaws. A lever 86 made fast at one end to the rocker shaft 83, outside of the box 55 extends rearwardly and upwardly and carries at its free end a roller 87. A cam 88 is mounted on a rocker shaft 89 and projects rearwardly and upwardly. An arm 90 projects from the cam 88 and carries a stop pin 91, preferably adjustable, which engages a fixed abutment 92 to limit the upward swing of said cam 88, and is normally held in its backward position by a spring 93. The spring however yields to allow the cam 88 to turn down under pressure. When the jaw carrier moves forward from its starting point the roller 87 engages with the cam 88, and rides under it and thereby tips down the rear end of said lever 86 and rocks the shaft 83. This bends the toggle joint formed by the rod 81 and lever 82 as shown in dotted lines in Fig. 7 thereby rocking the shaft 43 and opening the lower jaw 42. The jaw will remain open until the jaw carrier has moved forward far enough for the roll 87 on lever 86 to pass out from engagement with the cam 88 and the parts are so adjusted that the said disengagement will not occur until the jaws have moved their full forward stroke to receive the flap of the carton blank between them. When the disengagement from the cam 88 occurs, the spring 84 will close the jaws into gripping engagement with the flap of the blank and retain the grip until positively disengaged.

When the jaw carrier moves back from the first forward stroke the roll 87 on lever 86 will engage the upper side of the cam 88 and turn said cam 88 down, pulling back the stop pin 91 against tension of the spring 93, without opening the jaws, but when it goes forward again the roll 87 on lever 86 will again engage the under side of the cam 88 and open the jaws. During this second forward stroke the jaws will push the carton blank forward on the support beneath the stack holder.

The movable or tilting support beneath the stack holder to which reference has been made is as follows: (See Figs. 1 and 2). Two yoke levers 100 are each fulcrumed at one end on a stud 101 on which the said yoke can rock, its other end being free to move up and down. Each yoke lever is formed with a downwardly extending U-shaped portion intermediate its ends, and the base of this U-shaped portion is pivotally connected at 102 with the upper end of a rod 103, the lower end of said rod 103 being pivotally connected with one arm of a bell crank lever 104 fast on shaft 105, the other arm of said lever 104 being pivotally connected with one end of a rod 106, the other end of said rod 106 being connected with one end of a lever 107 whose other end is pivoted on shaft 602 and carries intermediate its ends a roll which engages with a cam 94 on shaft 50. See Figs. 2 and 4.

The upper side of each yoke lever 100 is provided with lugs which support two rails 108, 109, said rails 108 and 109 being in alinement with each other, but with a space between their adjacent ends to allow them to straddle parts of the machine which would otherwise interfere with their movement. The two sets of rails 108, 109 are parallel with each other and support transverse rolls 110 to receive the carton blanks when they are removed from the stack. At the time when the jaws draw the blank from the stack, the yoke lever 100 will be in the tilted position shown in Fig. 2 and the rear end of the blank will drop down onto the rails 108 while the forward end will be in the grip of the jaws. On the next forward movement of the jaw carrier after the blank has been pulled out of the stack, the blank will be pushed by the jaws back on the said support until the rear end is pushed onto the rails 109. At this point the yoke will rise slightly above the position shown in Fig. 2, enough for the rolls 110 to raise the blank into engagement with friction feed rolls 111 and the action of said feed rolls 111 will carry the blank farther back until the rear end of the blank rests on the base 112 of an angular rail which extends lengthwise of the machine, the upright portion 113 of said rail 112 serving as an edge guide for the blank in its subsequent travel to the forming block. The feed rolls 111 are continuously driven by any suitable means. In the machine shown in the drawings they are driven by shaft 143 through suitable connections. See Fig. 1.

The cam which actuates the yoke levers 100 is so constructed and adjusted that after the blank has been seated on the rolls 110 and pushed back against the edge guide 113, the said yoke levers will be rocked down into the position shown in dotted lines in Fig. 2, the blank being now horizontal. A rail 114 extends parallel with the guide rail 112, the upper surface of which is on the same level as the base 112 of the guide rail when the yoke levers are in their lowermost position. This is slightly above the level of the upper surface of the supporting rolls 110 so that when the yoke levers have dropped to their lowest position the blank will be supported by the base 112 of the edge guide and by the said rail 114. When in this position it is ready to be transferred to a position beneath the forming block 7, that is, to the left as viewed in the plan view, Fig. 1. This will be at right angles to the path of travel which it took in being withdrawn from the stack and pushed onto the supporting rolls 110 mounted on the rocking yoke levers. The means for thus moving the blank will now be described. A lever 115 is mounted fast on a rocker shaft 116 which is journaled in a bracket 118, said lever extending up above one side of the tilting yoke lever supports 100, as shown in Fig. 2. A spring 117 is coiled around said shaft 116, one end being secured to the bracket 118 in which the shaft is journaled, the other end being fast to a collar 119 on the shaft, said spring being under tension. A lever 120 is mounted fast on said shaft 116 and carries a roll which engages with a cam surface on the back side of the sealing lap glue roll cam 604 to rock said shaft 116 at the proper time so as to draw the upper end of lever 115 back, and then when the said roll on the lever 120 rides off of the high part of said cam surface the spring 117 will rock the shaft 116 back and throw the lever 115 forward. This action is so timed that the forward throw will occur after the tilting yoke levers have dropped down to deposit the blank on the rails 114 and 112, and the result is that the lever 115 will strike the edge of the carton blank a sharp blow and cause it to slide on the rails 114 and 112 far enough to be engaged between upper and lower feed rolls 123 and 124 which carry the blank forward until the advance end strikes the stops 125 and 125 (see Fig. 3). There should be at least four sets of feed rolls 123 and 124, two sets parallel with each other to grip the blank in its forward shoot from the lever 115, and two more sets farther on toward the former 7 to seize the blank after it has been partially advanced by the first set, so as to carry the blank farther along.

In Fig. 1 only one feed roll 123 is shown, namely, the farther upper roll of one set.

In Fig. 16 one pair of upper and lower feed rolls are shown, and the parts are broken away to show more clearly the lower feed roll of another pair. One set of both upper and lower feed rolls 123 and 124 are shown in detail in Fig. 17. Preferably the upper feed rolls 123 have a flat periphery and the lower feed rolls 124 have a beveled periphery. The upper feed rolls 123 are each mounted on a shaft 127 which is unyielding up and down. The lower feed roll 124 is journaled in a lever 128 which is pivoted on stud 129 mounted in bracket 135. A spring 132 under tension has one end resting on the rear extension of lever 128 and the other end bears against the under side of a bracket 133 mounted on stud 129 thus holding the roll 124 in yielding engagement with the upper feed roll 123. An adjustable stop screw 134 mounted in a boss on lever 128 bears up against one arm of bracket 133 and regulates the upward movement of the roll 124.

The lower feed rolls 124 are driven by friction with the upper feed rolls 123. The shaft 127 which carries the upper feed rolls is journaled in the bracket 135 which is arched over the feed rolls. It is connected with the frame 136 by a boss 137 set into a recess in the frame and can be removed therefrom so as to entirely remove the feed rolls and the guides 112 if for any reason it is desired to remove them to accommodate passage of blanks of exceptional width. A pinion 138 mounted on shaft 127 engages with a gear 139 on shaft 140, said shaft 140 carrying a bevel gear 141 which engages with a bevel gear 142 mounted on shaft 143. A sprocket 131 mounted on shaft 143 is connected by a chain (not shown) with a sprocket (not shown) on shaft 426 whereby the feed rolls 123 are continuously rotated. A pinion 143, mounted on a stud 144 also engages with gear 139 and with a gear 145 whereby movement is transmitted to gear 95 on a shaft (not shown) for actuating the second set of feed rolls. Pinion 138 also engages with gear 145, but if pinion 138 together with shaft 139 and the connected parts and feed rolls should be removed, as previously described, the second set of feed rolls will still be actuated by power transmitted through pinion 743.

In the travel of the blank between the feed rolls 123 and 124 the blank is guided at its rear edge by vertical guides 146 similar to the vertical guides 113, said guides 146 rising from horizontal plates 147 which support the blank. The plates 147 are slotted to allow the feed rolls 123 and 124 to engage the blank. (See Fig. 16.)

After the blank passes off the supporting and guide plates 147 it is delivered onto other supports, consisting of plates 148 and 149 and it is carried forward by its own momentum after it leaves the last set of feed rolls 123, 124. The support 148 is formed with a vertical guide 150, and the support 149 is formed with a vertical guide 151. As the glued faces of the flaps $f, h, i$, all slide on the plate 149, it is preferable to form the said plate with a turned up lip 152 which engages the flap instead of having the full width of the plate engaged by the flap, so as to avoid the gumming up of the plate as much as possible.

In order to insure the blank being guided into proper position for the folding mechanism, the rear guide 150 is fixed, but the front guide 151 is movable slightly toward and from the fixed guide, and has a laterally flaring entrance edge 153 to guide the blank into the passage, then the front guide 151 is moved toward the fixed guide to push the blank into engagement with the fixed guide. Also, in order that the advance end of the blank in entering between the guides 150 and 151 may not be obstructed by striking against the end of the plate 149, the plate 149 has an inclined portion 154, and means are provided for engaging the rear end of the blank and giving it a forward push after it has been delivered onto the supporting plates 148, and 149 by the feed rolls 123 and 124. See Figs. 1, 8 and 10.

The mechanism for actuating the side guide and for giving the impetus to the blank above mentioned is as follows: The movable front guide plate 149 carrying the guide 151 is supported on studs 155 which project from the forked lever 156 which is mounted on a rocker shaft 157 having one of its bearings in the frame 158, said rocker shaft giving to the guide plate 151 the lateral movement above mentioned. The guide plate 149 is also adjustable on the studs 155 to vary the predetermined distance from the rear guide plate 148. An arm 159 is fixed to said shaft 157, and is pendent therefrom. The rocker shaft 105 has mounted thereon an upturned finger hook 161 which when the shaft 105 rocks in one direction engages the hanging end of arm 159 and moves said arm to the right of the position shown in Fig. 9, thereby rocking the lever 156 and spreading the guide plate 149 away from the fixed guide plate 148, and widening the entrance. When the finger 161 is released from the arm 159 the spring 162 will pull the arm 159 back so that the stop pin 163 carried by the arm 159 will strike against the stop 164 and throw the guide plate 149 in again. A bevel segment gear 165 on shaft 105 engages with a bevel segment gear 166 on shaft 170 so that when shaft 105 rocks it will cause shaft 170 also to rock for the purpose of actuating the pusher plate 171 which pushes the blank onto the guide plates 148, and 149 previously referred to. See Figs. 8 and 9.

Push plate 171 is mounted on a lever 172 which itself is mounted on an endwise reciprocable rod 173. Said rod 173 is mounted in a slide block 174, and is preferably adjustable therein longitudinally.

A bracket 175 projects from the frame 158 and is formed with a cam slot 177 which has a horizontal portion and terminates in a downwardly inclined portion. A pin 178 extends through the said slot 177 and is threaded through the slide block 174 and has a cylindrical check nut 168 on its end. A slidable guard plate 179 is mounted on the bracket 175, having flanges at the top and bottom which engage the top and bottom edges of the bracket, said plate 179 being horizontally slidable on said bracket. This guard plate is formed with a vertical elongated slot 180 through which the pin 178 extends. A roller 181 carried on the pin 178 engages with the slot 180 in the guard plate 179 and also in the cam slot 177. A washer 182 on the pin 178 serves to hold the slide block 174 and the guard plate 179 against the bracket 175. A lever 183 is mounted fast at its lower end on rocker shaft 170, and a lever 184 is mounted loose on said shaft, the upper ends of said levers engaging opposite sides of the check nut 168. A tension spring 185 tends to hold the levers 184 and 185 in embracing relation with the check nut 168. The rocking of the shaft 170 in one direction will cause the lever 183 to move the pin 178 back through the slot 177 (to the right as shown in Fig. 10) and down the inclined portion of the slot, thus moving the rod 173 and the push plate 171 back and down. When the shaft 170 rocks in the reverse direction the lever 184 will carry the pin 178 up through the inclined portion of the slot and then through the horizontal portion. The cam which actuates the rocker shaft 170 is so timed as to cause the upward and forward movement of the push plate 171 at the right time to engage a blank as it comes from the stack. The spring 185 allows a yielding movement of the lever 184 if the push plate 171 completes its forward throw before the rocker shaft 170 has finished its stroke. An adjustable stop pin 186 limits the forward thrust of the guard plate 179 and thereby limits the forward throw of the push plate 171.

The blank now being positioned beneath the forming block 7, the next thing in the operation is to fold the side flaps. The usually preferred form of carton is oblong rectangular in cross section so that two of the side forming flaps are wider than the other two. This is the form illustrated because it is more convenient to designate the different flaps and sides of the forming block in describing the machine. The forming block is set on one of its narrow sides. When the blank is positioned beneath it, the narrow flap $c$ will lie immediately beneath the block, the flaps $b$ and $a$ extending beyond and the flap $d$ and the side sealing lap $e$ extending backward. The gummed bottom forming flaps $f$, $g$, $h$, $i$, will lie toward the front of the machine. The side forming flaps are first folded and sealed, and then the blank in its tubular form is pushed along on the block to the position at the end of the block where the bottom forming flaps are folded. In folding the side forming flaps, the blank is carried up against the bottom of the block and the flap $c$ is clamped against the block, then the flaps $b$ and $d$ are folded against the sides, then the sealing lap $e$ is turned over with the gummed face uppermost, then the flap $a$ is folded over onto the lap $e$. The flaps $b$ and $d$ are folded by rollers and the sealing lap $e$ by fingers, and the flap $a$ by a hinged plate. See Figs. 18–27 and 29.

The mechanism for clamping the flap $c$ to the block and for folding the side flaps $b$, $d$ will be first described. A vertically reciprocable platform 190 provided with a downwardly extending stem 191 is located beneath the block 7. Two brackets 192 are mounted upon said platform in each of which is journaled a shaft 193 on which are mounted rollers 194. In the drawings there are shown three rollers 194 mounted on each shaft 193. See Fig. 3. The brackets 192 are adjustably mounted on the platform 190 so as to adjust the distance apart from each other. They should be adjusted at the right distance apart so that when the platform rises there will be just space enough for the thickness of the blank between the rolls and the block 7. In Fig. 22 the position of the rolls when the platform is in its lowermost position is shown in dotted lines.

A horizontal plate 195 is mounted on a vertically movable rod 196 which extends through a hole in the platform 190 and through a tubular passage in the stem 191. The stem 191 is formed with a slot 197, and the rod 196 is provided with a collar 198 which is adapted to engage the shoulder of the stem 191 at the upper end of the slot 197 to limit the upward movement of the rod 196 with relation to the platform 190.

A spring 199 coiled around the rod 196 is seated on the shoulder of the stem 191 at the lower end of the recess 197, the upper end of the spring bearing against the collar 198. The normal position of the platform 190 and stem 191 is in its downward position, with the rollers 194 in the position as shown in dotted lines in Fig. 22, and the collar 198 of rod 196 bears against the shouldered upper end of the recess 197. In that position of the platform the rod 196 will be also in a downward position, the plate 195 being down some distance below the block 1 and below the level of the blank which is seated on the rails 148 and 149. The raising and lowering of the platform and stem 191 is accomplished by a cam 201 mounted on shaft 50, said cam being engaged by a roll on a lever 202, said lever having a pivotal connection with a rod 203 which in turn is connected with a bell crank lever 204 mounted on shaft 205, said bell crank being connected with a connecting rod 206 which is connected with stem 191.

The form of the cam 201 and intermediate connections is such that the elevating movement of the stem 191, and parts carried thereby will occur after a blank is properly positioned on the rails 148, 149 beneath the block. When the stem 191 rises it will carry up both the platform 190 and the rod 196; the plate 195 and rolls 194 will engage and lift the blank from the rails 148, 149, until the blank strikes the under side of the block 7, while the platform will continue to rise and the rolls 194 will bend the blank along the scored lines between the flaps $c$ and $b$ and between the flaps $c$ and $d$ and fold the flaps $b$ and $d$ up against the sides of the block as shown in Fig. 22. This continued upward movement of the platform and stem after the plate 195 has engaged the blank against the block, will cause the compression of spring 199 and this will cause an elastic clamping pressure of the blank by the plate 195 against the block.

The means for folding the narrow sealing lap are as follows: The block 7 is preferably formed with a groove 210 in the upper side lengthwise thereof, extending in from the edge over which the sealing lap is folded, said groove having an inclined face 211 against which the sealing lap is folded. The purpose of having the sealing lap folded down past the right angle is to break its spring so that after the outer flap $a$ is folded over it, the spring of the sealing lap in its tendency to open out again will not cause the unsealing of the flap.

A yoke 212 shaped in cross section something like an inverted U extends transversely of the machine at some distance above the block 7, and parallel with the block. An arm 213 is hung from a rocker shaft 214 mounted in a bracket 215 on the side of the yoke 212 so as to swing in a direction transversely of the block when the shaft rocks. The arm 213 is preferably extensible as by means of a plate 216 formed with an elongated slot 217 and clamped to the arm 213 by means of a clamp screw 218. The extension plate 216 is formed with bosses at its lower end which serve as bearings for a rocker shaft 219 on which are mounted a series of fingers 220.

The arm 213 is hung in such location that normally the fingers 220 extend down alongside of the upwardly extending sealing lap $e$ after the side flaps $b$, $d$ have been folded, and when the shaft 214 is rotated in a direction to swing the arm 213 to the left, looking as in Fig. 27, the fingers 220 will swing in an upward curve in engagement with the sealing lap $e$ and bend it in over the edge of the block. The fingers 220 are short enough to just clear interference with the block in the upward swing. A finger 221 also mounted on shaft 219 is a little longer than the fingers 220, and a little back of the fingers 220, so that it lags behind the fingers 220. This finger is too long to clear the block 7 so that it strikes the side of the block or rather the blank folded on the block, as shown in Fig. 23 after the folding fingers 220 have swung up past the corner of the block and have bent the sealing lap $e$ over at something of an angle to the side flap. As soon as the finger 221 engages the block or the blank on the block, the further rotation of the shaft 214 in the same direction will cause the arm 213 to continue to swing farther up but the shaft 219 will rotate backward and thereby turn the fingers 220 down as shown in Fig. 27 and thus bend the sealing lap $e$ farther down over the sharp edge of the block and inclined face 211 and into the groove 210.

A coiled spring 222 on shaft 219 has one end fast to the said shaft and the other end fast to the bearing. When the said shaft 219 is rotated backward by the engagement of the finger 221 with the block as above described, the said spring will be coiled to greater tension. When the shaft 214 is rocked in the reverse direction by its actuating cam, so as to swing the arm 213 backward, and thereby withdraw the finger 221 from the block, the rock shaft 219 will yield to tendency of the spring 222 to uncoil and therefore rotate in the reverse direction to its previous direction of rotation, thereby turning up the fingers 220 so that they will be able to clear interference with the block on the further backward swing of the arm 213.

A finger 223 mounted on shaft 219 stands at such an angle to the finger 220 as to engage a stop pin 224 secured to the plate 217 and limit the rotation of shaft 219 and the upward turn of the fingers 220 on their return movement.

The mechanism for actuating rocker shaft 214 is as follows: An arm 660 is made fast at one end to rocker shaft 214, as shown in Fig. 4, and at its other end is pivotally connected to one end of a rod 661, the peculiar shape of said arm 660 being merely to enable it to extend over the top of the yoke 212. The other end of said rod 661 is connected with one end of a lever 662 (see Fig. 3) fulcrumed on the shaft 607 and carrying a roll which engages with a cam path in one side of a cam 663 on shaft 50.

A hanger 225 is adjustably connected with a reciprocable carriage 226 mounted on an axle 227 which is provided with wheels or rollers 228 which travel in grooved ways 229 in the yoke 212. The hanger 225 has secured at its lower end a plate 230 to the under side of which are secured the brackets 231. A rocker shaft 232 is journaled in bearings on one of the brackets 231. Two blocks 233 are each mounted fast on said rocker shaft 232, having a flat face to which is secured a flap folding plate 234.

The carrier 226 is normally in its rearward position with the folder plate 234 back of the station for folding the flap, although alongside of the block, and the rocker shaft 232 is normally in such position on its axis that the folder plate 234 is turned up vertically, as shown in Fig. 3.

The rear end of the block 7 is formed with a cam surface 235. (See Figs. 18 and 19.) For the mechanism for actuating the folder plate 234 see Figs. 29, 30, 31. A lever 236 which is journaled on a stud 238 mounted in the bracket 231 and which lies alongside of the block 7 is provided at one end with a roll 237 which when the carrier is in its rear position is adapted to engage with said cam surface 235 of the block. The other end of said lever 236 carries a bevel segment gear 239 which engages with a bevel gear 240 mounted on the rocker shaft 232. A coil spring 241 surrounding said shaft 232 has one end made fast to the bracket 231 and the other end made fast to a collar 242 which is fixed to the shaft. When the carrier 226 moves forward, carrying the hanger 225 and other parts hung thereon as already mentioned, the roll 237 will ride on the cam surface 235 of the block, and through the lever 236 the shaft 238 will be rotated and thereby through the bevel gears 239 and 240 the shaft 232 will be rotated in a direction to turn the folder plate 234 from the vertical to horizontal position. The cam surface 235 is so located and formed that this turning down of the folder plate 234 will take place when the carrier has moved the folder plate to a position alongside of the carton blank on the block. The block 233 which holds the folder plate 234 is formed with a tail 243. When the said block 233 is turned up with the folder plate in the vertical position, the tail 243 will strike against the edge of the rib 207 to prevent the folder plate from turning past the vertical position.

The actuation of the folder plate 234 to fold the flap $a$ is timed to occur after the sealing lap $e$ has been folded. On the return movement of the carrier the spring 241 will rotate the shaft 232 backward and cause the folder plate to turn up to the vertical position again when the roll 237 rides back over the cam surface 235. The carrier will not however make the said return movement immediately after the folding of the flap $a$, but it will continue its forward movement with its attached parts pushing the carton blank along with it to a position near the forward end of the block. The push mechanism is as follows: The block 7 is formed with side grooves 244 extending lengthwise thereof. See Figs. 19, 20, 29. Plates 245 are secured to the brackets 231, each having a finger 246 which engages respectively in the grooves 244 in the block and when the carrier continues its forward movement after the flap $a$ has been folded by the plate 234 these said fingers will engage the rear end of the blank and slide it along on the block.

The mechanism for actuating the carrier 226 is as follows: A double grooved pulley 247 is mounted on a rocker shaft 248. See Figs. 1 and 3. This is located at the upper rear side of the machine, above the rear end of the block 7. A pulley 249 is mounted on shaft 250 above the front part of the block 7. A tape 251 is made fast at one end to the carrier 226, thence it passes along under and up over the pulley 249 and back under an idler pulley 252; thence up to the pulley 247 where it is secured in one of the grooves in the pulley. A tape 253 is made fast at one end to the carrier 226, thence it passes back under and around the pulley 247 to which it is made fast.

When the pulley 247 rotates in the direction of the arrow in Fig. 3 the tape 251 will wind around the pulley 247 and be drawn under and over pulley 249, thereby pulling the carrier 226 toward the right, that is, toward the pulley 249, this being in a direction to move the folder plate 234 into operative position for folding the flap $a$ and then to move the carrier farther along to push the carton to the right-hand end of the block. During this movement the tape 253 pays out by unwinding from pulley 247. On the reverse rotation of the shaft 248 the tape 251 will unwind from pulley 247 and pay out over pulley 249, while the draft on the carrier will be through the tape 253 which winds up on pulley 247. At the forward end of the stroke of the carrier it is held steady by means of a spring catch 255 which is engaged by a pin 256 mounted on the carrier.

The shaft 248 is given its rotation in both directions by means similar to those by which the shaft 58 which actuates the jaw carrier is actuated. It is not therefore deemed necessary to repeat the description in detail. Some of the corresponding parts are as follows. The internal gear wheel is represented by 259 and the plate by 260.

The plate lever 266 is loosely mounted on the hub of the plate 260 and is formed with segmental slots 269 and 270 through which the clamping bolts 271 pass into the plate 260. Lever arm 272 projects from the internal gear wheel 259. Plate lever 266 is pivotally connected with one end of a connecting rod 273, the other end of said rod 273 being connected with a lever 274 which carries a cam roll engaging a cam path in one face of cam 275 on cam shaft 50. Lever 272 which extends from the internal gear wheel 259 is pivotally connected with a rod 276 whose lower end is connected at 277 with a lever carrying a roll which engages with a cam path in the opposite face of cam 275 from that which is engaged by the roll on lever 274. The cam is so constructed as to its operating cam paths that the shaft 248 will be rotated alternately in opposite directions and at proper intervals and rests to actuate the carrier 226 so as to carry the folder plate 234 to position for folding the flap $a$, then to move on to the end of its forward stroke and return again.

After the blank with its sides folded as described has been slid along to the end of the block 7, it is desirable to apply pressure mechanism to the four sides or panels of the folded carton on the block to prevent possible bulging out of the sides or unsealing while the bottom forming flaps are being folded against the end of the block. The mechanism for doing this is specially shown in Figs. 32, 33, 34.

The under panel, that is, the one which is on the under side of the block, is pressed by a vertically movable plate 285 mounted on a lever 286. The two side panels are pressed by the two plates 287, and 288 carried respectively by the horizontally reciprocable levers 289 and 290, and the upper side panel is engaged by a plate 291 and yielding presser plate 292 carried by the lever 293 which is pivotally connected with a bracket which is vertically adjustable in the frame 158. The presser plate 291 is narrow to engage that portion of the panel $a$ which overlies the sealing lap $e$ and is more rigid than the plate 292 which engages the remaining portion of panel $a$. The mechanisms for actuating these presser plates are connected together in such manner as to be applied simultaneously and by the same power.

Lever 286 which carries the lower presser plate 285 is pivotally connected at one end with a bracket which is vertically adjustable in the frame 158. The vertical adjustment of the brackets to which the levers 286 and 293 are pivoted is to accommodate forming blocks of different sizes. The other end of said lever is connected by a universal joint 295 with the upper end of rod 296, the lower end of said rod 296 being connected by a universal joint 297 with one arm 298 of a two armed rocking lever mounted on rocker shaft 299 which is journaled in bearings in the frame of the machine. The other arm 300 of said rocking lever is connected by a universal joint 301 with the lower end of a connecting rod 302. Said connecting rods 296 and 302 are both shown as made in several sections for purpose of adjustment, but the combined sections of each are referred to as one rod. The upper end of rod 302 is connected by a universal joint 303 with lever 293 which carries the upper presser plate. The presser plate 291 is secured to the lever 293 by bolts 304 which pass through elongated slots 305 in the web of the lever 293. The spring plate 292 is of an inverted L shape in cross section. See Fig. 25. The plates 291 and 292 lie at right angles to each other, one end of plate 291 being connected to an adjacent end of plate 292. See Figs. 24 and 25. The elongated slots in plates 291 and 292 are for purpose of adjustment. A pin 306 having a head on its lower end passes up loosely through the horizontal flange of the spring plate 292 and through the flange 307 on the side of lever 293. A spring 308 retains the plate 292 by a yielding pressure on the panel of the carton when the lever 293 is in the position shown in Fig. 32 for clamping the carton on the block.

The lever 289 of side presser plate 287 is pivotally connected at 313, 313 with the two horizontal rocker arms 309, 309 which are connected respectively by the pin 310 and rocker shaft 311 with the bracket 312 projecting from the frame of the machine. A lever 314 is mounted fast on shaft 311, at some distance below the lever 289, as shown in Fig. 32. A connecting rod 315 extends from one side to the other below the block 7 and is pivotally connected at one end with said lever 314 and is pivotally connected at its other end with a lever 316 which is mounted fast on a vertical rocker shaft 317 which rises on the opposite side of the block 7 from the rocker shaft 311. The lever 290 which carries presser plate 288 is pivotally connected at 318, 318 with the two horizontal rocker arms 319, 319, similar to the manner in which rocker arms 309 are connected with the lever 289 of presser plate 287. Shafts 311 and 317 respectively pass through bearings 321 and 322 near their lower ends. Said rocker arms 319, 319 are connected respectively with the pin 320 and shaft 317 which are journaled in the bracket 323 projecting from the frame of the machine. A bent lever 324 is fulcrumed intermediate its ends to a stud 325 projecting from the frame of the machine. The upper arm of said lever 324 is connected at its upper end by a rod 327 with a lever 328, said lever 328 being a horizontal rocking lever mounted on rocker shaft 317. The lower arm of said lever 324 is bent in peculiar form, and has a cam surface 329 which is adapted to be engaged by a roll 330 on a stud 331 carried by the upper end of a rocking lever 332 mounted on shaft 299. A connecting rod 333 is pivotally connected at one end with said stud 331, the other end of said rod 333 being connected with a lever having a roll which engages with a cam 335 on shaft 50.

By means of the cam 335 the lever 332 is rocked in a direction to cause the roll 330 to engage cam surface 329 and thereby rock the lever 324, and, through rod 327 and lever 328, to rotate shaft 317 in a direction to straighten the toggle joint formed by the levers 316, 314 and connecting rod 315, thereby turning the levers 319 and 309 in opposite directions to each other, but both away from the block 7 and thus moving levers 290 and 289 also away from the block and withdrawing the presser plates 288 and 287 away from the block. The same movement of the lever 332 will rock the shaft 299 to pull down the vertical rod 296, presser lever 286, and presser plate 285, and will move upward the vertical rod 302, presser lever 293, and presser plate 291, and all of the presser plates will then be free from the block 7. The cam 335 is so constructed that by the time a blank is in position on the block for the bottom forming flaps to be folded the presser plates will close again. A spring 336 which is connected at one end with lever 324 and is connected at the other end with the frame of the machine causes a sharp movement of the lever 324 to close the side presser plates 287, 288 when the lever 333 has moved back far enough for the roll 330 to become disengaged from the cam surface 329, as shown in Fig. 34. This causes a yielding pressure by the plates on the carton against the block.

The carton now being clamped in tubular form on the block, the bottom end forming flaps are to be folded. See Figs. 3, 35, 36, 37, 38. The mechanism is as follows: First, a finger 340 comes down from above and folds the uppermost end forming flap $f$, then a finger 341 moves up and folds the lowermost end forming flap $h$, or both may be folded simultaneously if they are made short enough so as not to overlap each other, then the roll 342 sweeps in from the side to fold one of the remaining end forming flaps and then the plate 343 swings in from the other side to fold the last of the end forming flaps.

The finger 340 which has a curved engaging end extends up through a guide 344 and is loosely engaged by a lever 345 fast to a shaft 346. A lever 337 is fast to shaft 346. A vertical connecting rod 347 is pivotally connected at its upper end with said lever 337 and at its lower end it is pivotally connected with one arm of a lever 348 fulcrumed at 349, the other arm of said lever 348 being connected with a link 350 which connects with a bell crank lever 351 fulcrumed on shaft 607 and carrying a roll which engages with a cam path in one face of a cam 353 on shaft 50. This cam path is constructed so as to give the folding finger 340 its folding movement and retiring movement at the proper time.

Folding finger 341 extends down in a vertical guide 356 and is loosely connected at its lower end with one end of a lever 357 which is mounted fast on shaft 349. A lever 260 fast on shaft 349 is connected by a link 358 with a bell crank lever 359, said lever 359 being fulcrumed on shaft 607 and carrying a roll which engages with a cam path in the opposite face of cam 353 from that which is engaged by the roll in lever 351.

The folder 342 consists of a plurality of rolls mounted on a shaft 364 and separated from each other by spacing collars 363. Shaft 364 is journaled in bosses which form heads of pins 365 set on spring seats in a holder or carrier 366. The holder or carrier 366 is formed with bosses apertured to receive the said pins 365 and each having a spring 367 which forms a yielding seat for the pins 365, thus allowing the folder 342 a yielding action when it moves across the flap of the carton. The holder 366 is connected loosely with connecting rods 368 which in turn are connected at their ends with levers 369 mounted on a vertical rocker shaft 370. See Fig. 1. Said rocker shaft 370 is journaled in bearings 371 in a bracket on the frame of the machine. A lever 372 mounted fast on said rocker shaft is connected with a rod 373 which has a universal joint connection 374 with a lever 375 which carries a roll that engages with a cam path in one face of gear 655 on shaft 50. Said cam path is so constructed and adjusted with relation to the other cams on said shaft as to actuate the rocker shaft to swing the arms 369 at the proper time to cause the roller 342 to swing in and fold one of the end forming flaps.

The holder 366 is formed with guide flanges 377 which move in guide grooves 378 in a swinging bracket 379 which is hinged to the frame of the machine, as will be hereinafter described. This bracket is termed the presser frame. These guides 378 are for the purpose of causing the folder roll holder 366 to reciprocate in a straight line. See Figs. 35, 36, 39.

The folder plate 343 is pivotally mounted at its center on a horizontal screw stud 381 which projects from the holder or carrier 382. The folder plate is thus hung in a vertical position. Pins 383 pass loosely through the holder 382 and are secured to plate 343. Springs 384 around these pins hold the plate 343 spaced slightly away from the holder 382 and allow a slight rocking movement of the folder plate 343. The stud 381 passes through an elongated slot 385 in the holder and is adjustable horizontally therein, being clamped in its adjusted position by the clamp nut 386. A connecting rod 387 has a hinge connection with the holder 382. As shown, the said lever 387 is formed with a boss 388 on one end, apertured for passage of a stud which is journaled in ears 389 projecting from the holder 382. The other end of connecting rod 387 is pivotally connected with one end of a lever 390, the other end of said lever 390 being fast on a vertical rocker shaft 391 journaled in a bearing 392. See Fig. 4. The lower end of said rocker shaft has a lever 393 mounted fast thereon which is pivotally connected with one end of a rod 394, the other end of said rod 394 being pivotally connected with one end of a lever 395 which carries a roll engaging with a cam path in the opposite face of gear 655 from that which is engaged by the roll on lever 375 which actuates the folder roll 342. This cam is of such form of construction and so adjusted on said cam shaft that the lever 387 will cause the holder 382 to move in and fold the last of the end closing flaps at the proper time. The pivotal connection of the several levers allows the folder plate to move in a straight line and the holder plate 382 slides in guide ways 378.

It is important that the end closing flaps shall be put under pressure against the end of the block after being folded in order to insure the adhesion of the glued flap to its contacting flap before the carton is stripped from the block. To this end the folder plate 343 which folds the last flap is made to serve also as a presser plate. The swinging bracket 379 in which the folder plate holder 382 is held is formed as a rectangular skeleton frame having at one end a barrel through which a hinge pin 617 passes by which it is hinged in bearings 615 which are shown as lugs on the frame (see Figs. 1, 4, 28, 37 and 38). At the opposite end of the presser frame 379 there are two horizontally extending lugs or ears 628 which are parallel with each other, one above the other, and are apertured for passage of a pin 618 to which, between the ears 628 there is connected one end of a link 619. The other end of said link 619 is pivotally connected at 620 with one end of a lever 621 which is fast on the vertical rocker shaft 622, which is journaled in bearings 623 in the frame. A lever 624 is also fast at one end to said shaft 622, and is connected at its other end with one end of a rod 625, the other end of said rod 625 being connected with a lever 626 which is provided with a roll that engages with a cam path in the cam 627 on shaft 50. The link 619 and lever 621 form a sort of toggle joint. When the shaft 622 is in the position shown in Figs. 1 and 28 the toggle joint is straight and the presser frame is held with the folder plate 343 pressing the folded end forming flaps against the end of the block. The cam 627 is so constructed and adjusted on shaft 50 with relation to the other actuating cams that the shaft 622 will be rocked to straighten the toggle joint as shown in Fig. 28 and apply the pressure to the folded end flaps just as the last flap is folded. It is not necessary to maintain the pressure for any great length of time, and in order to permit speedy work of the machine the shaft 622 will be almost immediately rocked to bend the toggle joint enough to release the pressure, and the folder plate holder 382 will be moved in its guide ways 378 off to one side, that is, to the left as viewed in Figs. 1 and 28, the folder roll 342 having previously moved to the right before folder plate 343 moved in, so that there is now no obstacle in front of the carton to prevent its being stripped off from the block.

The means for actuating the presser plates for clamping the four sides of the tubular carton against the block are so timed with relation to the mechanism for folding the end forming flaps that the presser plates will be withdrawn after the end flaps are folded so that the carton may be discharged from the block.

The mechanism for discharging or stripping the carton from the block consists of a plunger or slide rod which extends longitudinally through a hole in the block and is adapted to engage the inner folded end flap and push it off of the block. The carton as it passes off the block is engaged between two feed rollers which grip and carry it slightly farther forward and drop it onto a carrier belt or other suitable place of deposit.

The stripping mechanism will now be more particularly described. The block 7 is formed with a hole 401 extending longitudinally and centrally through it from end to end. See Figs. 3, 18-21. A slide rod 402 extends through the said hole, being normally sufficiently retracted so that its forward end will not protrude from the end of the block, otherwise it would interfere with the folding of the end flaps. The rear end of the rod is pivotally connected with one arm of a bell crank lever 403 fulcrumed at 404 on a bracket attached to the frame of the machine. The pivot connection of the lever 403 with the rod 402 allows loose play so that the push rod 402 will move in a straight line. The other arm of said bell crank lever 403 is pivotally connected with one end of a rod 405 whose other end is pivotally connected with a cam lever 406 fulcrumed on shaft 607 and carrying a roll which engages with a cam path in a cam on shaft 50 to cause the reciprocation of the push rod 402 at the proper time. The cam path is not shown but it is in the opposite face of the same cam disk in which is the cam path 663 shown in Fig. 4 which controls rocker shaft 214.

The stripper rolls 410, 410 are each mounted fast on a vertical shaft 411 journaled in a yoke shaped holder 412, which is hinged to the bracket 379 by a pin 413 and shaft 414. See Figs. 1, 3 and 39. The said hinged holders 412 are each normally prevented from turning on their hinges by a bent wire 415 which is secured to the frame and has a hooked end which engages with a hole in the holder. Thus the holders 412 are retained in position to maintain the stripper rolls 410 at a predetermined distance apart. The wires 415 may be adjusted so as to allow a greater or less spread of the holders and therefore of the stripper rolls with relation to each other. A gear wheel 416 mounted on one of the two shafts 414 meshes with a gear wheel 417 mounted on a shaft 418, and a pinion 419 on each of the shafts 411 meshes respectively with one of said gear wheels 416, 417. See Figs. 1, 3, 4 and 39.

Shaft 418 is journaled at its lower end in a bearing in a box bracket 419 and carries a bevel gear 420 which engages with a bevel gear 421 on a shaft 422 journaled in said box bracket 419. Said shaft 422 carries a sprocket wheel 423 from which a sprocket chain 424 runs to a sprocket wheel 425 on the main shaft 426. See Figs. 3 and 4. The chain 424 passes under guide and tension sprockets 427, 428. Sprocket 428 is adjustable in its bearings in bracket 429 to take up slack in the chain. Thus the discharge feed rolls are continuously rotated, being always ready to grip and feed the cartons as they finally come from the block 7. Shaft 418 has universal joint connections 430, 431 at its ends with the gear 17 and gear 420 respectively, to allow for the movement of the press frame 379.

There is preferably provided a carrier which shall receive the cartons from the discharge rolls 410 and remove them to the filling mechanism or to any other distributing station desired. It is also preferable to have means provided whereby in case the cartons are not taken care of at their destination as fast as they are delivered by the carrier, the operation of the mechanism for drawing the blanks from the stack will be stopped or rendered inoperative until the clog of accumulated cartons is removed. The mechanism for doing this will be described. See Figs. 40-45.

A conveyer belt 441 runs over a pulley 442 and over another pulley (not shown, the belt being broken away) and is continuously driven by any suitable mechanism (not shown). The conveyer belt is located on a lower level than the discharge outlet between the stripper rolls 410, 410 and in such proximity to the said discharge outlet that as the carton passes out from between the rolls 410, 410 it will fall onto the conveyer belt. A platform 444 is provided onto which the carton falls before it drops onto the conveyer, the said platform being formed preferably with a downwardly curved end so as to guide the carton to proper standing position on the conveyer. Side guards 443 are also provided.

At some suitable point alongside of the conveyer, there is journaled a vertical rocker shaft 445 to which is made fast a lever 446 which is bent so that it has an arm 447 extending in a transverse direction over the conveyer and thence turning to point in the same direction that the top run of the belt travels. This arm is at such an elevation that when it is turned in over the carrier belt as shown in Fig. 40 it will lie in the path of the cartons and serve as a stop to prevent them from being carried past until the lever 446 swings back to withdraw the arm. The movement of the rocker shaft 445 controls the movement of the cams which actuate the gluing pad carrier 10 and the blank separator fingers 46.

A lever 448 is mounted fast on shaft 445 and is pivotally connected with one end of a rod 449, (see Figs. 40 and 41) the other end of said rod being connected with a lever 450 (see Fig. 42) fulcrumed on a shaft 451 mounted in a bracket 452 at the base of the machine. Said lever 450 carries a roll 453 which engages a cam 454 on cam shaft 50 which thereby rocks the lever 450 and, through the connecting rod 449, rocks the lever 448 and causes the arm 447 to move out to one side of the path of travel of the cartons on the belt. The cam shaft 50 revolves continuously. A cup-shaped disk or shell 455 is fast on said shaft and is formed with a notch 456 in the annular flange 472 of the shell. See Figs. 42-45. A disk 457 is loose on said shaft and is formed with a quill 458 on which are mounted fast the cams 616 and 49 which respectively actuate the glue pad carrier and the separator fingers. The disk 457 is formed with an annular flange 460 having a radial inwardly extending lug 461, and in said lug portion 461 there is a radial slot in which is slidably mounted a key 462. The disks 455 and 457 are mounted on said shaft 50 with their flanges facing each other and close together. When they are not keyed together the disk 457 does not revolve with the shaft, but the disk 455 does revolve. The key 462 is formed with a web 473 on its inner end which projects out of the radial recess in the flange 460 so that it extends above the flat surface of the said flange, but the outer end portion 463 is only just thick enough to fill the radial recess in the flange 460 and come flush with the face of the flange. When the key is pushed outwardly the thickened portion or web 473 of the key will engage with the notch 456, but when the key is pushed radially inward the web portion 473 will be withdrawn from the said notch. A spring 464 tends to push the said key outward and to hold the key with the web 473 in engagement with the notch. When they are thus engaged the disk 457 and its quill will revolve with the cam shaft and the cams mounted on the quill which actuate the glue pad carrier and separator fingers will rotate.

The cam 454 acting on the roll 453 of the lever 450 normally causes a reciprocation of the rod 449 once in each direction at each rotation of the cam and is so constructed that it will make such reciprocation once for each carton that is delivered to the carrier from the forming block. When the arm 447 swings out, the carton on the belt will move on past the arm. Then the arm will swing in again before the next carton arrives so as to be in a position to intercept the carton on its arrival and hold it there until the arm swings out again. If, however, there is a blockade of cartons so that the arm 447 in swinging back strikes the side of the carton, the shell 456 will become disengaged from the shell 455 so that the shell 455 and quill 458 which carries the cams for actuating the glue pad and the separator fingers will come to a stop. The mechanism for doing this is as follows: A lever 465 of general triangular shaped body has a long curved tongue portion 466 at its upper end, and is pivoted on a stud 467 at the base of said tongue portion. At the end of the tongue the said lever carries a roll 474 which engages the cam 459 on shaft 50. Said cam 459 causes the said lever 465 to swing in and out with relation to the periphery of the disk 455. When the said lever is in its most downward position with its inner face nearest to the periphery of the disk 455 the outer end of the key 462 will engage the curved face of said lever which is at that time eccentric with the shaft 50, and which thereby acts as a cam to force the said key radially inward and disengage the web portion 473 of said key from the notch 456, thereby causing the disk 457 to stop rotation and stop the movement of the glue pad and separator fingers. In the normal operation of the machine, however, the said lever 465 is prevented from swinging into the position to act on the key until after the shell 455 has rotated far enough to bring the notch 456 and the key past the cam surface of said lever 465. Said lever 450 is a bell crank lever having an arm 468 formed with a hook 469 which is adapted to engage the said lever 465 at the lower right-hand corner 471. Now, the construction of the cams 454 and 459 is such that at each rotation of the shaft 50 the high part of the cam 459 will engage the roll 474 to swing the said lever 465 up into operative position to engage the end of said key, as previously mentioned, and then the cam 454 will by its engagement with the roll 453 on lever 450 turn the latch lever arm 468 up so that its hook 469 will engage the corner 471 of the lever 465 to hold said lever in the operative position for disengaging the key, but before the disks 455 and 457 rotate far enough to bring the said key against the cam surface 470 of the said lever 465 the high part of the cam 454 will have moved past the roll 453, thus leaving the lever 450 free to swing back. The weight of the arm 468 is great enough so that of its own gravity it will then drop out of engagement with the lever 465, and the lever 465 also will swing back so that there will be no disengagement of the key from the notch.

If, however, by reason of a blockade of the cartons on the belt the arm 447 on its attempted return movement from its outward swing strikes against the side of a carton, the rod 449 will remain stationary and will hold the lever 450 at its extreme outward position where it was carried by the high part of the cam 454 and when the high part of the cam 454 rides off of the roll 453, said roll 453 will be entirely clear of the cam, so that as long as the lever 450 is thus held back the cam 454 in its continued rotation will have no effect on said lever 450. Therefore, during the time that this condition exists the hook 469 after it has come into latching engagement with the lever 465 will remain in that position so that the cam surface 470 of the lever 465 will be operative on the key 462, disengaging it from the notch, and therefore stop the movement of the gluing pad and separator fingers. If the gluing pad and separator fingers are stationary, even though the other cams continue their rotation, and the other parts of the machine go through their movements there will be no more blanks drawn from the holder. Such blanks, however, as are already in process of being folded, that is, such as have already been drawn from the stack and are part way through the machine, will go through their several processes until they are discharged fully folded.

If now, after a period of disengagement of the key from the notch due to the blockade, the blockade shall be broken, then the arm 447 will be again free to swing in over the belt, the lever 448 will be free to rock toward the belt, and the rod 449 will be free to move toward the right, as viewed in Fig. 40, and this movement will be accomplished by reason of the fact that the said rod 449 being thus free to move allows the latch arm 468 to respond to its tendency to drop under its own weight and rock the shaft 451.

Sometimes it is the case that it is desired to retain the latch 469 in engagement with the lever 465 so as to keep the key 462 out of engagement with the notch, and thereby restrain the feeding of the blanks from the stack for a period of time without stopping the entire machine, which could be done by disengaging the clutch of the main driving shaft. Means for doing this are provided as follows: A lever 475 mounted fast on the rock shaft 451 is connected with one end of a rod 476, (see Figs. 2 and 4) the other end of said rod 476 being connected with one end of the lever 477, fulcrumed on the stud 478. Said lever 477 has an intermediate portion of horse-shoe form, the ends of said horse-shoe portion being formed with lugs 479. A weighted lever 480 is also fulcrumed on said stud 478 and may be swung on said fulcrum so as to lie either in the position shown in Fig. 2 with the weight toward the right, said lever resting on the right hand one of the said lugs 479, or be swung over so as to point to the left and rest on the left hand lug 479. When in the position shown in Fig. 2 it holds the connecting rod 476 in its uppermost position so that it will hold the lever 475 turned up to retain the hook lever 468 in position for engagement with the lever 465 in just the same position as is accomplished by the blockade of cartons, and as long as the weighted lever 480 remains in this position it will keep the glue pad and separator fingers inoperative. By swinging the weighted lever 480 over to the left so that it shall rest on the left one of the lugs 479 of the lever 477 the weight will cause the connecting rod 476 to descend and to disengage the latch lever 469 from the lever 465, thus allowing the key 462 to engage with the notch 456 and the gluing pad and separator fingers will again become operative.

Means are provided for automatically supplying blanks to the stack, and the delivery is controlled by the blanks in the stack in such manner that the feeding mechanism will be rendered inactive when the pile in the stack rises above a predetermined height. In the mechanism shown they are raised by an elevator to a height greater than the stack and are then discharged one at a time from the top of the pile on the elevator down an incline into the stack, and the regulating means above mentioned stops the elevating mechanism and the discharge mechanism which discharges from the elevator into the chute when the pile in the stack rises above the predetermined height. The mechanism will now be described. See Figs. 47–51. The elevator consists of a platform 491 movable in inclined guides 492, being shown as having axles 493 with wheels or rolls 494 which run in guide ways between the guides 492. The platform is suspended by chains 495, one end of each chain being attached to the elevator platform, the chain running up over a sprocket 496 and having at its other end a weight 497 which takes up the slack in the free end of the chain.

An inclined chute 498 extends from the discharge side of the upper end of the elevator well down to a point somewhat above the magazine or holder for the stack of blanks from which they are carried to the former block. At the top of the incline is an abutment 500 over which the topmost blank in the pile on the elevator is fed by a feed roll 501 so that it will tumble down the inclined chute 498. The depth of the space between the feed roll 501 and the abutment 500 is just enough to allow passage of only one blank at a time. Preferably the feed roll has a frictional surface of rubber or some other material. At the foot of the incline 498 a plate or finger 502 is pivoted on a rocker shaft or stud 503, said finger extending down at one side of the stack of blanks in the holder or magazine, that is, at one side of where the pile of blanks will rise if there are enough in the stack to rise above a predetermined height. The said finger is given a vibratory or oscillating movement, swinging out over the top of the blanks in the stack and back again so long as the pile of blanks do not rise high enough to interfere. When the pile of blanks rises above the predetermined height the finger 502 will strike the edge of the blanks which will thereby stop the vibration, because the framework of the magazine will prevent the blanks from being pushed out of the magazine. On the rocker shaft 503 on which the finger 502 is mounted a lever 504 is also mounted fast and is pivotally connected with one end of a rod 505, the other end of said rod 505 being pivotally connected with a lever 506, which is mounted fast on a rocker shaft 507. Said rocker shaft 507 is connected with mechanism for actuating the same and it also through intermediate mechanism actuates the feed roll 501 and controls the mechanism for raising the elevator. When the finger 502 is restrained from vibratory movement by its contact with the pile of blanks, the rocker shaft 507 will be prevented from rocking and will stop the elevating and feeding mechanism. This mechanism will now be described. A shaft 508 extends up at an incline alongside of the elevator well in suitable bearings and is in continuous rotation. The means shown for giving it the rotation is a bevel gear 509 on shaft 499 which engages with a bevel gear 510 on shaft 508 which is connected with main driving mechanism (not shown). A bevel gear 512 is fast on the upper end of shaft 508 and engages with a bevel gear 513 which is loose on shaft 514. Said shaft 514 is journaled in suitable bearings in the frame. A clutch 515 having an annular groove in its periphery is splined to the shaft 514 in such manner as to be slidable thereon but it rotates therewith. It is provided with pins 516 which project from the face thereof and at right angles thereto and are adapted to engage with slots in the face of the bevel gear 513 and when so engaged the shaft 514 will rotate by means of the continuously rotating shaft 508. A spring 517 tends to keep the clutch in engagement with the bevel gear 513, but at certain times the clutch is thrown out and kept from being moved back.

A worm 518 is mounted on shaft 514 and engages with a worm gear 519 on a shaft 520 journaled in bearing 522 in the frame. Said shaft 520 carries a worm 521, and said worm 521 engages with a worm gear 523 which is loose on a shaft 524. A clutch disk 525 is splined to shaft 524 in such manner as to rotate therewith and is slidable thereon. It has two pins 526 which project from the face thereof and at right angles thereto, and are adapted to engage with slots in the face of the worm gear 523. When the clutch is thus engaged the shaft 520 will be rotated by the shaft 514 and the intermediate mechanism, provided shaft 514 is rotating. On account of the variation in diameter of the connecting gearing the shaft 524 will rotate at a less speed than the shaft 514. The clutch 525 is provided with a hub 527 formed with an annular groove in which is a collar 528 which has pins 529 engaging with the fork 534 of one arm of a bell crank lever 530. Said lever 530 is mounted on shaft 531 and by rocking said lever the said clutch 525 may be moved into and out of engagement with the worm gear 523. This lever 530 can be operated by means of a hand lever 532 which is pivotally connected with one end of a rod 533, the other end of said rod being pivotally connected with one arm of bell crank 530.

A rocker shaft 535 is journaled in bearings in the frame of the machine. A plurality of pins 536, preferably four in number as shown, project from the face of the worm gear 523, at right angles thereto, and are disposed at equal distances from each other. A lever 537 is mounted fast on said shaft 535 and projects down into the path which the pins 536 describe when the worm gear 523 rotates. When the worm gear 523 rotates, and one of the pins 536 engages the lever 537 it will rock the shaft 535. A torsion spring 538 on said shaft has one end fast to a collar on the shaft and the other end fast to the frame so that when the shaft is rotated by the worm gear 523 as above described it will give tension to the spring 538 which will tend to recoil and will rotate the shaft back again when the shaft is permitted to yield to the spring.

A lever 539 is fulcrumed at one end on a stud 540, so as to rock in a vertical plane, said stud being itself slidable longitudinally in a horizontal direction in bearings in the frame. Said lever 539 carries a pin 541 which is adapted to engage with the annular groove in the clutch 515. When said pin is in engagement with the groove in the clutch, if the stud 540 is moved longitudinally it will move the clutch into or out of engagement with the bevel gear 513, according to the direction of movement, and thereby give rotation to shaft 514 or stop its rotation, as the case may be.

The sliding movement of the stud 540 is given by a cam-faced arm 542 which is mounted on shaft 535 and engages between two rolls 543, 544 fixed to the stud 540. When the shaft 535 rotates in a direction to turn up the toe of the cam-faced arm 542 as viewed in Fig. 49 the engagement of the cam with the roll 543 will cause the stud 540 to move toward the left as viewed in said Fig. 49, and when it rocks in the reverse direction the other side of the cam will by engagement with the roll 544 cause the stud 540 to move to the right. The pin, however, is lifted out of the groove before the movement of the stud 540 to the left and the spring 517 then throws the clutch into engagement.

The means for lifting the lever 539 is as follows: The said lever 539 has at the end opposite its fulcrum end a lug 545 formed with a vertical flaring aperture through which passes a rod 546 which is vertically reciprocable and carries a collar 747 which when the rod 546 moves up will engage the lug 545 and lift that end of the lever 539 and disengage the pin 541 from the annular groove in the clutch. The aperture in the lug through which the rod 546 passes is made flaring to allow proper play for the rod and for the rocking of the lever. The lower end of the rod 546 is connected with one arm of a lever 547, mounted fast on rocker shaft 507, the other arm of said lever 547 carrying a roll 548 which engages with a cam 549 mounted on shaft 508, thereby giving a continuous rocking movement to the lever 547.

The clutch 525 is made with tapering sides, cone-shaped which are adapted to fit into a cone-shaped recess 551 in the case sufficiently tight so that when the clutch is pulled back by means of the lever 530 out of engagement with the worm gear 523 into said recess 551 the walls of said recess will form a frictional brake on the clutch when the shaft 524 is allowed to rotate. When the elevator has reached the top of its movement and it is desired to allow it to descend to be filled up again with blanks the clutch 525 will be thus disengaged by means of the hand lever and the weight of the elevator will be sufficient to cause it to descend, thereby rotating the shaft 524 backward and the walls of said recess 551 will, as above described, constitute a brake to retard the rapid descent of the elevator.

Assuming that the clutch 515 is in engagement with the bevel gear 513 by means of the pins 516 the shaft 508 which is constantly rotating will rotate the shaft 514 and thereby through the worm 518, worm gear 519, shaft 520 and worm 521, rotate the worm gear 523 on shaft 524, and if the clutch 525 has been engaged with the worm gear 523, shaft 524 will be caused to rotate also, thereby rotating the sprocket wheels 496 and raising the elevator. The rotation of the shaft 514 will cause the feed wheel 501 to rotate and feed the blank down the chute 498, and the rotation of the shaft 524 will cause the elevator to bring another blank up into position to be engaged by the feed roll 501.

When during the rotation of the worm gear 523 which, as already described, is slower than the rotation of the shaft 514, one of the pins 536 projecting from the worm gear 523 engages with the lever 537, said lever 537 will be rocked up, thereby turning the shaft 535 against the tension of the spring 538, turning up the toe of the cam 542. This is the position shown in Figs. 48 and 49 of the drawings, one of the pins 536 being just about ready to ride away from engagement with the lever 537. As soon as the worm gear 523 has moved a little past the position shown in Figs. 48 and 49 and far enough to release the pin 536 from the lever 537, the torsion of the spring 538 will cause the shaft 535 to rock back, thereby causing that face of the cam 542 which is in engagement with the roll 544 to push the stud 540 to the right of the position shown in Fig. 49, and by reason of the engagement of the pin 541 with the annular groove in the clutch 515 the clutch 515 will be moved to the right, disengaging the clutch from the bevel gear 513 and compressing the spring 517 so that now the shafts 514 and 524 will be brought to a standstill. A spring 550 has one end fast to the rod 505 and the other end fast to the chute. When the rod 505 is in its downward position the spring is under tension. When the shaft 508 has rotated far enough to bring the low part of the cam 549 into engagement with the roll 548 on lever 547 the spring 550 will contract, thereby causing the rod 505 to move up and rock the shaft 507. This will turn the lever 547 in a direction for the roll 548 to follow down on the low part of the cam 549 and for the left arm of the lever 547 viewed in the direction of Fig. 48 to turn up, thereby lifting the rod 546 and the lever 539 and thereby raising the pin 541 out of the annular groove in the clutch 515. The clutch 515 will then be free to respond to the expansion of the spring 517 and throw the clutch back into engagement with the bevel gear 513 so that the shafts 514 and 524 will again begin to revolve and operate the feed wheel 501 and the elevator. At the beginning of this new rotary movement of the shaft 514 the stud 540 will be left in its right-hand position to which it was carried by the backward rocking movement of the cam 542, the lever 539 being in its turned-up position, holding the pin 541 above the annular flange of the clutch 514. As soon, however, as the worm gear 523 has rotated far enough for one of the pins 536 to turn up the lever 537 the shaft 535 will be rocked in a direction to carry the toe of the cam 542 forward and up so as to slide the stud 540 to the left and to bring the pin 541 directly in alinement with the annular groove in the clutch 515, but still held above the groove.

As soon as the high part of the cam 549 has come into engagement with the roll 548 on the lever 547 said lever 547 will be rocked in a direction to pull down the rod 546 and allow the pin 541 to drop into the annular groove in the clutch 515. The lever 539 being fulcrumed at one end of the stud 540, the other end of said lever being free to rise and fall as allowed by the loose play of the rod 546 in the slot in the boss 545 of said lever, gravity will be sufficient to cause said lever 539 to drop down in the manner above described and the operation will be continued.

Assuming, however, that the pile of blanks in the stack has risen high enough to prevent the finger 502 from swinging, then the connecting rod 505 will be unable to respond to the pull of the spring 550 to pull up the rod 505. Therefore after the stud 540 has been pulled to the right by the cam 542 and the clutch has been disengaged the lever 506 will be prevented from rocking in a direction to cause the rocker shaft 507 to turn the lever 547 in a direction to lift the rod 546 to disengage the pin 541 from the annular groove in the clutch 515. In such case the clutch will not be free to respond to the pull of the spring 517 and therefore the clutch will remain disengaged from the bevel gear 513 until such time as the pile of blanks in the stack has become lowered sufficiently to allow the finger 502 to swing forward.

When the stud 540 slides in either one direction or the other the lever 539 which is fast to said stud will move with it broadside, although it has the rocking movement up and down. For this reason the vertical rod 546 is loosely connected at 751 with the lever 547 in such manner that it can rock on its axis in a vertical plane.

The shaft 426 drives the glue rolls, the transferring rolls and the stripper. The shaft 50 carries the cams. The mechanism for driving the shaft 426 and the shaft 50 and for controlling the stopping and starting of said shafts is as follows: The main shaft 630 is driven in any suitable manner as, for instance, by a pulley 631 mounted fast on said shaft and driven through a belt connecting it with the power from the engine. A spreader cone 632 is loose on said shaft 630 and is adapted to actuate a clutch 633, one member of which is fast on the shaft 426 and the other member of which is fast on shaft 630. Clutch cone 632 is formed with an annular groove 634 which is engaged by a pin 635 carried by a lever 636 fulcrumed at 637. Said lever 636 carries a roll 638 which engages in a cam path 639 in a cam disk 640 which is made fast to a horizontal lever 641. Said lever 641 is connected by a rod 642 with an operating lever 643 so that said lever 641 may be moved to oscillate the cam disk 640. Said lever 643 is connected with one end of a shaft 656 on which is a hand lever 657. When said lever 643 is moved in one direction it causes the cam path 639 to move the cone clutch member 632 in a direction to engage with the clutch member 633 which is fast on the shaft 426 and thereby cause rotation of the shaft 426 by reason of its then connection with the main driving shaft 630. When moved in the reverse direction it will disengage the clutch so that shaft 426 will be stopped from rotation.

One member of a clutch 644 is loose on shaft 630 and the other member is fast on said shaft and a spreader cone 645 is loose on said shaft 630. A gear wheel 646 is made fast to the hub of the loose member of the clutch 644 and is loose on shaft 630. The spreader cone 645 is adapted to actuate the fast member of the clutch 644 by means of a lever 647 fulcrumed at 648 and having a pin which engages with the groove 649 in the annular hub of clutch 645 and carrying a roll 650 which engages with the cam path 651 in said disk 640 which thereby controls the engaging and disengaging of the clutch 644 to give rotation to the gear wheel 646. Gear wheel 646 engages with the gear 652 which is fast on shaft 653. Said shaft 653 carries a gear 654 which engages with the gear 655 mounted on the cam shaft 50.

By operating the lever 643 in one direction or the other at the will of the operator, therefore, the shafts 426 and 50 may be connected or disconnected with the main driving shaft. The shape of the cam grooves or cam paths 639 and 651 is such that the clutch 633 is engaged by the driving shaft before the clutch 644 is put into driving connection, and clutch 644 is thrown out of driving connection in advance of the disengagement of the clutch 633 so that the glue rolls, transferring mechanism and the strippers which are actuated by the shaft 426 will come into operation before the cam shaft and will continue in operation after the cam shaft is thrown out of engagement.

What I claim is:

1. Mechanism for forming a carton out of a single blank previously cut to form side panels and end forming flaps and previously scored to from definite folding lines for the said panels and flaps, said mechanism comprising a forming block of cross sectional contour such as to fit the said previously scored folding lines for said panels, means for folding the blank around the sides of the forming block along said predetermined folding lines to form the body of the carton with overlapping panels, means for positioning the tubular body of the carton on the forming block so that the said predetermined folding lines of the end forming flaps will register with the end of the forming block, and means for folding the end forming flaps against the end of the forming block.

2. Mechanism for forming a carton out of a single blank having side panels and end forming flaps, said mechanism comprising a forming block, means for folding the blank around the sides of the block with overlapping panels and sealing the overlapping panels to form the tubular body of the carton, means for positioning said body of the carton on the forming block so that the folding lines of the end forming flaps will register with the end of the forming block, means for folding the several end forming flaps into overlapping relation against the end of the forming block, means for moving the folder for the outermost flap in from one side to fold said flap, and means for actuating said last folder toward the end of the forming block after the said last flap is folded to positively press the folded flaps against the end of the forming block.

3. Mechanism for forming a carton out of a single blank having side panels and end forming flaps, said mechanism comprising a forming block, means for folding the blank around the sides of the block with overflapping panels and sealing the overlapping panels to form the body of the carton, means for positioning the tubular body of the carton on the forming block so that the folding lines of the end forming flaps will register with the end of the forming block, means for folding the end forming flaps against the end of the forming block, means for sealing the outer end forming flap to the contacting end forming flap or flaps, a stripper which slides the carton partially off of the forming block, draw rolls spaced apart from each other which engage opposite sides of the carton in its squared out form after it has been partially ejected from the forming block and remove the carton from the block while the carton is in its squared out form, and means for maintaining the said draw rolls at a predetermined distance apart from each other while they are removing the carton.

4. In combination with a forming block, means for folding a blank upon the block to form a tubular body and a closed end for the carton, a follower which extends longitudinally through the block, means for reciprocating said follower in such manner as to cause it to engage the inner face of the closed end of the carton to partially eject the carton from the block, a pair of draw rolls located in front of the said forming block and spaced apart from each other and so positioned as to grip the carton in squared out form when it has been partially ejected from the block by the follower to complete the stripping of the carton in squared out form from the block, and means for maintaining the draw rolls at a predetermined distance apart from each other while they are engaged with and are removing the carton.

5. In combination with a forming block, means for folding a blank upon the block to form a tubular body and a closed end for the carton, means for partially stripping the carton from the block so that its closed end will project beyond the end of the forming block, a pair of draw rolls located in front of the forming block and spaced apart from each other and so positioned as to grip the partially ejected carton and complete the removal from the forming block, while the carton retains its squared form.

6. In combination with a forming block, means for folding a blank upon the block to form a tubular body and a closed end for the carton, means for partially stripping the carton from the block so that its closed end will project beyond the end of the forming block, a pair of draw rolls spaced apart from each other, located in front of the forming block and so positioned as to engage opposite sides of the partially ejected carton and complete the removal of the carton from the forming block while the carton retains its squared form, and a receiver onto which the squared out carton is discharged in standing position on its bottom when it is released from the draw rolls.

7. In a machine for forming a carton out of a single blank having four side panels and a side sealing lap, a forming block around which the blank is folded to form the body of the carton, said forming block being formed with a longitudinal groove in one face near the edge thereof over which the sealing lap is to be bent, means for folding the panels which form the body of the box around said block, means for folding said sealing lap over the edge adjacent to said groove, means for bending said sealing lap beyond the right angle and down into said groove and means for folding the coöperating panel outside of said sealing lap.

8. Mechanism for forming a carton out of a blank having side panels and end forming flaps, said mechanism comprising a forming block, means for folding the blank around the sides of the block with overlapping panels and sealing the same to form the body of the carton, means for positioning the tubular body of the carton on the forming block so that the folding lines of the end forming flaps will register with the end of the forming block, presser plates which engage the said panels and press them all against the forming block after the tubular body is positioned for the end forming and means for folding the end forming flaps against the end of the forming block while the body is clamped to the block.

9. In a machine for forming a carton out of a single blank having side forming panels and end forming flaps, a magazine to hold a stack of blanks, means for applying adhesive to one of the end forming flaps of the lowermost blank before it is started from the magazine, means for drawing the lowermost blank from the stack after the end sealing flap has received the adhesive, mechanism for folding and sealing the blank to form a carton, and mechanism for transferring the withdrawn blank to the folding and sealing mechanism.

10. In a machine for forming a carton out of a single blank having predetermined folding lines for side forming panels and end forming flaps, a forming block fitted to the said folding lines, means for folding the blank on the side folding lines into tubular form around the forming block, means for sliding the partially formed carton on the forming block far enough for said predetermined folding lines of the end forming flaps to register with the end of the forming block, and means for folding and sealing said end forming flaps to form the end of the carton.

11. In a machine for forming a carton out of a single blank, a forming block on which the blank is folded to form the body of the carton, means for folding the ends of the blank against the end of the block to form a bottom for the carton, and means for pressing the sides of the body of the carton against the forming block, while the end flaps are being folded.

12. In a machine for forming a carton out of a single blank, a forming block polygonal in cross section on which the blank is folded to form the body of the carton, means for folding the ends of the blank against the end of the block to form a bottom for the carton, and means for pressing all of the side panels of the body of the carton against the forming block while the end flaps are being folded.

13. In a machine for forming a carton out of a single blank, a forming block polygonal in cross section on which the blank is folded to form the body of the carton, means for folding the ends of the blank against the end of the block to form a bottom for the carton, and clamping plates which engage all of the side panels of the body of the carton over substantially their entire surface and press them against the side faces of the forming block while the end flaps are being folded.

14. In a machine for forming a carton out of a single blank, previously scored to form predetermined folding lines for side forming panels and bottom forming flaps, a forming block fitted to the predetermined folding lines, means for folding the blank about the block on the said predetermined side lines to form the body of the carton, means for positioning the folded body of the carton upon the block in such relation thereto that said bottom forming flaps project beyond the end of the block with the predetermined flap folding lines in alinement with the end of the block, means for folding said bottom forming flaps in overlapping relation against the end of the forming block, means for actuating the folder for the outermost bottom forming flap to move in from one side to fold said flap into overlapping relation to the other bottom forming flaps, and means for then actuating said last folder directly toward the end of the block after the end flaps are folded to press the said bottom forming flaps against the end of the block.

15. In a machine for forming a carton out of a blank having a sealing lap, a forming block on which the blank is folded to form the carton, said block being formed with a longitudinal groove in one face near the edge thereof over which the sealing lap may be bent, and means for bending the sealing lap over said edge and into said groove past a right angle to break the spring of the sealing lap.

16. In a machine for forming a carton out of a blank, a forming block, means for folding the blank in tubular form about the block to form the body of the carton, a transferring device having fingers which engage one end of the tubular body, means for actuating said transferring device to slide the said body along on the forming block toward the end, means for positioning the said body upon the forming block so that the folding lines of the flaps will register with the end of the block, and means for folding the end forming flaps against the end of the block.

17. In a machine for forming a carton out of a blank having end forming flaps, means for folding the blank in tubular form about the block to form the body of the carton, a transferring device having fingers which engage the rear end of the tubular body, said block being formed with longitudinal grooves in the side thereof to form ways for said fingers, means for actuating said transferring device to slide the said body along on the forming block toward the end, means for positioning the said body upon the forming block so that the folding lines of the flaps will register with the end of the block, and means for folding the end forming flaps against the end of the block.

18. In a machine for forming a carton out of a blank, having body forming panels and bottom forming flaps, a magazine to hold the blanks in a stack, a forming block, means for withdrawing a blank out of the stack, means for transferring the blank to the forming block, means for folding the body of the blank around the block to form the body of the carton, means for sealing the overlapping panels to seal the body of the carton, means for sliding the tubular body of the carton upon the forming block toward one end thereof, means for positioning the said body upon the block so that the folding line of the bottom forming flaps will register with the end of the block, and means for folding the bottom forming flaps against the end of the block.

19. In a machine for forming a carton out of a blank, having body forming panels and bottom forming flaps, a magazine to hold the blanks in a stack, a forming block, means for withdrawing a blank out of the stack, means for transferring the blank to the forming block, means for folding the body of the blank around the block to form the body of the carton, means for sealing the overlapping panels to seal the body of the carton, means for sliding the tubular body of the carton upon the forming block toward one end thereof, means for positioning the said body upon the block so that the folding line of the bottom forming flaps will register with the end of the block, means for folding the bottom forming flaps against the end of the block, and means for stripping the folded carton from the end of the block.

20. In a machine for forming a carton out of a blank having body forming panels and end forming flaps, a magazine to hold the blanks in a stack, a forming block, means for withdrawing a blank out of the stack, means for transferring the withdrawn blank to the forming block, means for folding the body of the blank around the block to form the body of the carton with an overlapping panel, means for sealing the overlapping and overlapped panels to seal the body of the carton, means for sliding the tubular body of the carton upon the forming block toward one end thereof, means for positioning the said body upon the block so that the folding line of the end forming flaps will register with the end of the block, means for folding the end forming flaps against the end of the block, means for stripping the folded carton from the end of the block, and a carrier onto which the finished carton is deposited by the stripper.

21. In a machine for forming a carton out of a blank having body forming panels and end forming flaps, a magazine to hold the blanks in a stack, a forming block, means for withdrawing a blank out of the stack, means for transferring the blank to the forming block, means for folding the blank around the block and sealing the same to form the body of the carton, means for sliding the tubular body of the carton upon the forming block toward one end thereof, means for positioning the said body upon the block so that the folding line of the end forming flaps will register with the end of the block, means for folding the end forming flaps against the end of the block, means for stripping the folded carton from the end of the block, a conveyer onto which the finished carton is deposited by the stripper, and means controlled by cartons on the conveyer to stop the movement of the mechanism for withdrawing blanks from the magazine if the cartons on the conveyer are held against movement.

22. In a machine for forming a carton out of a blank, a magazine to hold the blanks in a stack, a forming block, means for withdrawing a blank from the stack and for conveying it to the forming block, means for folding the blank upon the block to form a carton, means for stripping the folded carton from the block, a conveyer onto which the carton is deposited by the stripper, and means controlled by the cartons on the conveyer to stop the movement of the mechanism for withdrawing blanks from the magazine if the cartons on the conveyer are restrained from movement.

23. In a machine for forming cartons out of blanks, a magazine to hold a stack of blanks, a forming block on which the blanks are folded and sealed to form the body of the carton, means for transferring the tubular body of the carton to another position on the forming block, means for there folding and sealing end forming flaps, means for discharging the completed carton from the end of the forming block, said mechanisms being so constructed and arranged that a plurality of blanks may be simultaneously in successive stages of formation of the carton, and means controlled at the will of the operator whereby the mechanism which withdraws the blanks from the magazine may be stopped while the mechanisms for forming the cartons and transferring them continue their operation upon the blanks which are already in process of being folded and sealed.

24. In a machine for forming cartons out of blanks, a magazine to hold a stack of blanks, a forming block on which the blanks are folded and sealed to form the body of the carton, means for transferring the tubular body of the carton to another position on the forming block, means for there folding and sealing end forming flaps, means for discharging the completed carton from the end of the forming block, a conveyer onto which the cartons are discharged from the forming block, and means controlled by a blockade of cartons on the conveyer to automatically stop the withdrawal of blanks from the magazine independently of the mechanisms for forming and transferring cartons which are already in process of folding and transferring.

25. In a machine for forming cartons out of blanks, a magazine to hold a stack of blanks, a forming block on which the blanks are folded and sealed to form the body of the carton, means for transferring the tubular body of the carton to another position on the forming block, means for there folding and sealing end forming flaps, means for discharging the completed carton from the end of the forming block, a conveyer onto which the cartons are discharged from the forming block, means controlled by a blockade of cartons on the conveyer to automatically stop the withdrawal of blanks from the magazine independently of the mechanisms for forming and transferring cartons which are already in process of folding and transferring, and means controlled by the removal of the blockade so constructed and arranged that when the blockade is removed the mechanism for withdrawing the blanks from the magazine will automatically start again.

26. In a machine for forming cartons out of blanks, each blank having at one end thereof flaps for forming one end of the carton, a plurality of said end forming flaps being integrally united together at their sides, a magazine in which said blanks are stacked, means for seizing one of said integrally united flaps of the lowermost blank in the magazine and withdrawing the blank from the magazine, and means which sever the lateral union between said united flaps when the blank is withdrawn from the magazine.

27. In a machine for forming cartons out of blanks, each blank having at one end thereof flaps for forming one end of the carton, a plurality of said end forming flaps being integrally united together at their sides, a magazine in which said blanks are stacked, means for seizing one of said integrally united flaps of the lowermost blank in the magazine and withdrawing the blank from the magazine, and means connected with the gripping mechanism which sever the union between two adjacent flaps when the blank is seized by said gripping mechanism.

28. A machine for forming cartons out of blanks, each blank having folding lines along which the blank is to be folded to form the body of the carton, flaps at one end of the blank for forming the bottom of the carton, said bottom forming flaps being extensions respectively of the panels for the body of the carton, one of said end forming flaps being partially separated from the adjacent flap or flaps by a slit which extends from the end of the panel toward the outer end of the flap, but stopping short of the end, thereby leaving a slight union for the flaps at their outer ends, said machine having a magazine in which said blanks are stacked, and means for seizing and withdrawing the lowermost blank from the stack and which complete the severing of said union between said two adjacent flaps.

29. In combination with blanks for forming cartons in which each blank has folding lines along which the blank is to be folded to form the body of the carton, flaps at one end of the blank for forming the bottom of the carton, said bottom forming flaps being extensions respectively of the panels for the body of the carton, one of said end forming flaps being partially separated from the adjacent flap or flaps by a slit which extends from the end of the panel toward the outer end of the flap, but stopping short of the end, thereby leaving a slight union for the flaps at their outer ends, a machine having a magazine in which said blanks are stacked, and means for seizing and withdrawing the lowermost blank from the stack and which complete the severing of said union between said two adjacent flaps.

30. A machine for forming cartons out of blanks, each blank having folding lines along which the blank is to be folded to form the body of the carton, flaps at one end of the blank for forming the bottom of the carton, said bottom forming flaps being extensions respectively of the panels for the body of the carton, one of said end forming flaps being partially separated from the adjacent flap or flaps by a slit which extends from the end of the panel toward the outer end of the flap, but stopping short of the end, thereby leaving a slight union for the flaps at their outer ends, said machine having a magazine to hold a stack of blanks, a pair of gripping jaws, a carrier in which said gripping jaws are mounted, means for moving said carrier and gripping jaws toward the stack, means for causing the gripping jaws to seize the lowermost blank in the stack by said intermediate flap, and to withdraw the said blank from the stack, and means connected with the said jaws to complete the severing of said union between said gripped flap and the two adjacent flaps.

31. A machine for forming cartons out of blanks, each blank having folding lines along which the blank is to be folded to form the body of the carton, flaps at one end of the blank for forming the bottom of the carton, said bottom forming flaps being extensions respectively of the panels for the body of the carton, one of said end forming flaps being partially separated from the adjacent flap or flaps by a slit which extends from the end of the panel toward the outer end of the flap, but stopping short of the end, thereby leaving a slight union for the flaps at their outer ends, said machine having a magazine to hold a stack of blanks, means for applying adhesive to one face of the flaps other than the said intermediate flap, a pair of gripping jaws, a carrier in which said gripping jaws are mounted, means for moving said carrier and gripping jaws toward the stack, means for causing the gripping jaws to seize the lowermost blank in the stack by said intermediate flap, and to withdraw the said blank from the stack and means connected with the said jaws to complete the severing of said union between said gripped flap and the two adjacent flaps.

32. In a machine for forming a carton out of a blank having panel portions which form the body of the blank and extensions of said panels which constitute flaps to form an end for the carton, a forming block, means for folding the body of the blank around the forming block to form the tubular body of the carton, a carrier for sliding the tubular body to another position on the block where the end flaps are folded, guard plates connected with said carrier which engage the side panels of the body of the carton during said sliding movement to prevent the folded body panels from spreading, and means for folding the end forming flaps.

33. In a machine for forming a carton out of a blank, having panel portions which form the body of the blank and extensions of said panels which constitute flaps to form an end for the carton, a forming block, means for folding the body of the blank around the forming block to form the tubular body of the carton, a carrier for sliding the tubular body to another position on the block where the end flaps are folded, the forming mechanism which folds the last one of said body panels consisting of a hinge plate which normally stands up from the side of the forming block, mechanism for turning said hinge plate over to fold said panel, and means for retaining said hinge plate in folded position to serve also as a presser plate on the carton during the travel to the position for folding the end forming flaps.

34. In a machine for forming a carton out of a blank having panel portions which form the body of the blank and extensions of said panels which constitute flaps to form a bottom for the carton, a forming block, means for folding the body of the blank around the forming block to form the tubular body of the carton, a carrier for sliding the tubular body to another position on the block where the end flaps are folded, and means for pressing the said last folded panel during the travel of the body from the position where the panels were folded to the position where the end forming flaps are folded.

35. In a machine for forming cartons out of previously formed blanks which are cut to form side forming panels and end forming flaps with predetermined folding lines for the said panels and flaps, a forming block, mechanism for folding around the forming block a blank to form a tubular body for the carton, mechanism for positioning the tubular body of the block so that the predetermined folding lines of the said end forming flaps will be in alinement with the end of the block and mechanism for folding the projecting end flaps along said predetermined folding lines to form a closed end for the carton while on the forming block.

36. In a machine for forming cartons out of blanks, a magazine to hold a stack of blanks, a forming block, means for withdrawing one of the cartons from the stack and delivering it to the forming block, means for applying adhesive to certain of the flaps of the blank, means for folding the blank around the forming block to form the body of the carton and sealing the same, means for sliding the body of the carton on the forming block and positioning it so that the end forming flaps will be in alinement with the end of the forming block, means for folding the end forming flaps against the end of the block, means for stripping the completed carton from the forming block, and means controlling the operation of said several mechanisms whereby a plurality of blanks will simultaneously be in process of construction at different stages in the formation of the carton.

37. In a machine for forming cartons out of blanks, folding mechanism, means for feeding blanks to the folding mechanism, means for conveying the completed carton away from the folding mechanism and means controlled by the cartons on the conveyer in case of a blockade to check the feeding of blanks to the carton forming mechanism.

38. A magazine to hold a stack of blanks, a pair of movable gripping jaws, and means for moving said gripping jaws to engage and grip one of the blanks in a stack, said gripping jaws being provided with cutting blades at each end of one of the jaws which when the jaws grip the blank will cut the blank to separate the gripped portion from the portion of the blank at both ends of the jaws.

39. Mechanism for forming a carton out of a blank having side panels and a side sealing lap connected with one of the side panels, said mechanism comprising a forming block, means for folding the blank around the block into tubular form, means for sealing the side lap to one of the side panels, and means for pressing the said sealing lap and its overlapping side panel against said forming block while the carton is stationary.

40. In a machine for forming cartons out of blanks which have panels and a sealing lap to form the body of the carton and end flaps to form a closed end for the carton, a magazine to hold a stack of the blanks, means for applying adhesive to one or more of the said end forming flaps of the lowermost carton while in the stack, means for withdrawing said blank from the stack, means for applying adhesive to the said sealing lap while it is being carried from the stack, carton forming mechanism, and means for transferring the glued blank to the folding mechanism.

41. In a machine for forming blanks into cartons, a magazine to hold a stack of blanks, a reciprocating carriage, gripping jaws mounted upon said carriage, and means for reciprocating said carriage and actuating said jaws to seize the lowermost blank and withdraw it from the stack, a table beneath the magazine to receive the blank after it has been withdrawn from the stack, and means to further reciprocate said jaw carrier to position said blank upon the table after it has been withdrawn from the stack.

42. In a machine for making cartons out of blanks, a magazine to hold a stack of blanks, a pair of gripping jaws, a reciprocating carrier on which said jaws are mounted, and means for reciprocating said jaw carrier forward and back twice, the first forward movement being in a direction to grip the lowermost blank in the stack, the second movement being in the reverse direction to withdraw the blank from the stack, the third stroke being a forward movement to push the withdrawn blank onto a support beneath the stack and the fourth movement being a second return stroke to bring the jaw carrier back to its initial position, means for causing the said jaws to grip the blank on the first forward stroke, and means to cause the jaws to release their grip on the blank at the end of the second forward stroke.

43. In a machine for forming a carton out of a blank having panel portions which form the body of the blank, an extension of said panels which constitutes flaps to form an end for the carton, a magazine to hold a stack of said blanks, means for applying adhesive to the under side of certain of said end forming flap portions of the lowermost blank while in the stack and leaving unglued at least one of said flap portions, reciprocating gripping mechanism having jaws which after said adhesive has been applied grip between them the unglued flap portion and mechanism for then moving said gripping mechanism while the jaws still grip the flap and thereby withdrawing the blank from the stack.

44. In a machine for forming blanks into cartons, a magazine to hold a stack of blanks, reciprocating gripping mechanism which moves in one direction to seize a blank in the stack and which moves in the reverse direction to withdraw the seized blank from the stack, a tilting support beneath said stack onto which the free end of the blank will drop when it is pulled out from the stack by said gripping mechanism, means which reciprocate the gripping mechanism to further position the blank upon said support after it has been withdrawn from the stack, means for causing the said tilting support to descend, a track onto which the said blank is deposited by the descent of said tilting support, folding mechanism and means for transferring the said blank along said track to the folding mechanism.

45. In a machine for forming blanks into cartons, a magazine to hold a stack of blanks, means to withdraw one of the blanks from the stack, a forming block on which the cartons are formed, a support onto which the blanks are deposited when they are drawn from the stack, a track along which the blanks are moved from said support to the position for being folded upon the forming block, side guides between which the blank is caused to travel to the forming block, one of said side guides being laterally movable toward and from the other, means for driving the blank from said support along the track between said guides to the forming mechanism, and means for actuating said movable side guide to push the blank into engagement with the opposite side guide.

46. In a machine for forming blanks into cartons, a magazine to hold a stack of blanks, means to withdraw one of the blanks from the stack, a forming block on which the cartons are formed, a support onto which the blanks are deposited when they are drawn from the stack, a track along which the blanks are moved from said support to the position for being folded upon the forming block, side guides between which the blank is caused to travel to the forming block, one of said side guides being laterally movable toward and from the other, means for moving the blank from said support along the track between said guides to the forming mechanism, means for actuating said movable side guide to push the blank into engagement with the opposite side guide, and guards at the end of said track which coöperate with the said side guides to properly position the blank with relation to the forming block.

47. In a machine for forming blanks into cartons, a magazine to hold a stack of blanks, means to withdraw one of the blanks from the stack, a forming block on which the cartons are formed, a support onto which the blanks are deposited when they are drawn from the stack, a track along which the blanks are moved from said support to the position for being folded upon the forming block, side guides between which the blank is caused to travel to the forming block, means for moving the blank from said support along the track between said guides to the forming mechanism, said track having an inclined entrance, and means for pushing the blank up said inclined way onto the tracks.

48. In a machine for forming cartons out of blanks, a forming block, a support for the blank beneath the forming block, a vertically reciprocable member which lifts the blank from said support and clamps it against the under side of the forming block, folder rollers, a vertically reciprocable support on which folder rollers are journaled and normally located below the said support for the blank, said folder rollers being spaced apart from each other equal to the width of the forming block, and means for raising said folder rollers to engage opposite end portions of the blank and fold it up against the two opposite sides of the forming block while the blank is clamped against the bottom of the forming block by said clamping mechanism.

49. In a machine for forming cartons out of blanks, a forming block, a support for the blank beneath the forming block, a vertically reciprocable member which lifts the blank from said support and clamps it against the under side of the forming block, folder rollers, a vertically reciprocable support on which said folder rollers are journaled and normally located below the said support for the blank, said folder rollers being spaced apart from each other equal to the width of the forming block, means for raising said folder rollers to engage opposite end portions of the blank and fold it up against the two opposite sides of the forming block while the blank is clamped against the bottom of the forming block by said clamping mechanism, a vertically movable platform on which the mounts for the folder rolls are supported and in which the clamping mechanism is mounted, said clamping mechanism having also a sliding movement within said platform and a spring seat therefor so constructed that the clamping mechanism of the folder rollers will first rise together until the said clamping mechanism clamps the blank to the under side of the folding block and then the folder rolls will have a continued movement to fold the blank upon the forming block.

50. In a machine for forming blanks into cartons, a forming block around which the blank is folded, a vertically reciprocable platform located beneath the forming block, folder rolls mounted thereon, a vertically reciprocable clamping member mounted on said platform, and means for reciprocating said platform and causing said clamp to clamp the blank against the under side of the forming block and to cause said rolls to engage and fold the blank against two opposite sides of the forming block.

51. In a machine for forming blanks into cartons, a vertically reciprocable platform located beneath the forming block, a plurality of folder rolls, mountings on said platform in which said folder rolls are journaled and means for vertically reciprocating said platform in such manner that said folder rolls will engage the blank and fold it up against two opposite sides of the forming block.

52. In a machine for forming cartons out of blanks, having side forming panels and a side sealing lap, a forming block having in the upper face thereof a longitudinal groove near one edge thereof, mechanism for folding the side panels which form the body of the carton, and mechanism for folding said sealing lap over the upper edge of the forming block along said groove and bending it down into the groove, said mechanism comprising a hinged overhanging lever, a finger hinged to said lever, which normally extends down somewhat to one side of the upper part of said forming block, means for oscillating said lever in such manner that it will swing said finger into engagement with said sealing lap and fold it over the top of said groove in the forming block, and means which cause said folding finger to slightly turn back after it has folded the said sealing lap while the said lever continues its inward sweep and causes said folding finger to bend the sealing lap down into said groove.

53. In a machine for forming cartons out of blanks, having side forming panels and a side sealing lap, a forming block having in the upper face thereof a longitudinal groove near one edge thereof, mechanism for folding the side panels which form the body of the carton, and mechanism for folding said sealing lap over the upper edge of the forming block along said groove and bending it down into the groove, said mechanism comprising a hinged overhanging lever, a finger hinged to said lever, which normally extends down somewhat to one side of the upper part of said forming block, means for oscillating said lever in such manner that it will swing said finger into engagement with said sealing lap and fold it over the top of said groove in the forming block, means which cause said folding finger to slightly turn back after it has folded the said sealing lap while the said lever continues its inward sweep and causes said folding finger to bend the sealing lap down into said groove, and means which cause the return of said folding finger and said lever to their normal positions.

54. In a machine for forming blanks into cartons, a forming block, means for folding a blank over three sides of the forming block, means for turning in one edge of the blank over the fourth side of the forming block to form a sealing lap, and means for folding the other edge over the top of the forming block outside of said sealing lap, said last folding mechanism consisting of a carrier which is reciprocable alongside of the forming block, a hinged folder plate mounted upon said carrier and normally standing upright at one side of the forming block, means for turning said folder plate upon its hinge and fold said last mentioned panel of the carton, fingers secured to said carriage which engage the rear end of the folded blank, and means for reciprocating said carriage constructed and arranged in such manner that the carriage will be moved to push the carton along on the forming block after the said panel has been folded by the said hinged plate and will then actuate the said carriage to return to its normal position.

55. In a machine for forming blanks into cartons, a forming block, means for folding a blank over the bottom and against two sides of the forming block, means for turning in one edge of the blank over the top of the forming block to form a sealing lap, means for folding the other edge over the top of the forming block outside of said sealing lap, said last folding mechanism consisting of a carrier which is reciprocable alongside of the forming block, a hinged folder plate mounted upon said carrier and normally standing upright at one side of the forming block, means for turning said folder plate upon its hinge to fold said last mentioned panel of the carton, fingers secured to said carriage which engage the rear end of the folded blank, and means for reciprocating said carriage constructed and arranged in such manner that the carriage will be moved to push the carton along on the forming block after the said panel has been folded by the said hinged plate and will then actuate the said carriage to return to its normal position, said carriage also having mounted thereon side guards on opposite sides of the folded carton to guard the two vertical sides of the carton during the travel of the carton upon the forming block.

56. In a machine for forming into cartons blanks which have body forming panels and end forming flaps, a forming block, means for folding said panels around the forming block to form the body of the carton, means for positioning the folded body of the carton on the forming block near one end so that the folding lines of the flaps register with the end of the forming block, a folder roll which folds one of the end forming flaps, a folder presser plate which folds in the last of the end forming flaps on the opposite side from that folded by said folder roll, a holder for said folder roll and a holder for said folder plate, a hinged bracket having a guide-way in which the holders for said folder roll and folder plate are reciprocable, means for reciprocating said roll holder and plate holder in said bracket, means for controlling their reciprocation in such manner that the folder roll shall perform its folding operation in advance of the folding by the folder plate, and means for turning said hinged bracket on its hinge after the said flaps are folded and causing the said folder plate to press the last folded flap against the previously folded end flaps and the end of the block.

57. In a machine for forming blanks into cartons, a forming block, a way on which the blanks are moved to a position beneath the forming block, means for moving said blanks along said way, side guides along said way for opposite sides of the blank, one of which is fixed and the other of which is movable laterally toward the other side guide, and a back stop to limit the movement of the blank to a predetermined position beneath the forming block.

58. In a machine for forming blanks into cartons, a forming block, a way on which the blanks are moved to a position beneath the forming block, means for moving said blanks along said way, two fixed guides at right angles to each other, one of said fixed guides being for the side of the blank and the other of said fixed guides serving as a back stop to limit the end movement of the blank and two movable guides at right angles to each other to engage the other two sides of said blank to properly position the blank.

59. In a machine for forming blanks into cartons, a forming block, a way on which the blanks are moved to a position beneath the forming block, a pusher for moving said blanks along said way, a stop which is engaged by the advance end of the blank and limits its forward movement, said pusher forming a guard to prevent rearward movement of the blank when it has stopped, guards for the two side edges of said blank, one of said side guards being movable toward and away from the other, and means for actuating said movable side guard to move it against the side edge of the blank and hold the blank against the opposite side edge guard.

60. In a machine for forming cartons out of blanks of which each blank has at one end extensions to form end folding flaps, a holder for a stack of blanks, means for folding the blanks to form cartons, means for seizing one of the blanks in the stack and withdrawing it, and mechanism connected with the seizing and withdrawing mechanism to divide one of said projecting end portions of the blank to form a plurality of end forming flaps.

61. In a machine for forming a carton out of a blank, a forming block, a vertically movable support for a blank beneath the forming block, means for positioning a blank on said support, means for moving said support with the positioned blank in such manner that the said support presses the blank against the under side of the forming block and means for folding the blank around said block into tubular form for the body of the carton while it is pressed against the block by said support.

62. In a machine for forming cartons out of blanks which have panels and a sealing lap to form the body of the carton and end flaps to form a closed end for the carton, a magazine to hold a stack of the blanks, means for applying adhesive to one or more of the said end forming flaps of the lowermost carton while in the stack, means for withdrawing said blank from the stack, means for applying adhesive to the said sealing lap, carton forming mechanism, and means for transferring the glued blank to the folding mechanism.

In testimony whereof I affix my signature, in presence of two witnesses.

GEORGE A. ROBINSON.

Witnesses:
WILLIAM A. COPELAND,
ALICE H. MORRISON.

Corrections in Letters Patent No. 1,205,566.

It is hereby certified that in Letters Patent No. 1,205,566, granted November 21 1916, upon the application of George A. Robinson, of Boston, Massachusetts, for an improvement in "Machines for Forming Cartons," errors appear in the printed specification requiring correction as follows: Page 19, line 82, claim 1, for the word "from" read *form;* page 25, line 62, claim 45, after the word "cartons" strike out the comma; and that the said Letters Patent should be read with these corrections therein that the same may conform to the record of the case in the Patent Office.

Signed and sealed this 19th day of December, A. D., 1916.

[SEAL.]
R. F. WHITEHEAD,
*Acting Commissioner of Patents.*